United States Patent
Matsumoto

(10) Patent No.: US 7,801,979 B2
(45) Date of Patent: Sep. 21, 2010

(54) COMMUNICATION SYSTEM HAVING COMMON E-MAIL ADDRESS FOR PLURALITY OF DEVICES

(75) Inventor: Hideto Matsumoto, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 1170 days.

(21) Appl. No.: 10/714,876

(22) Filed: Nov. 18, 2003

(65) Prior Publication Data
US 2004/0103161 A1     May 27, 2004

(30) Foreign Application Priority Data
Nov. 18, 2002     (JP)     .............................. 2002-333868

(51) Int. Cl.
G06F 15/173     (2006.01)
(52) U.S. Cl. .................... 709/224; 709/203; 709/228; 713/100
(58) Field of Classification Search ................ 709/203, 709/224, 227, 206, 220, 228, 229; 705/26, 705/27; 713/201
See application file for complete search history.

(56) References Cited

U.S. PATENT DOCUMENTS

| | | | | |
|---|---|---|---|---|
| 5,416,842 | A * | 5/1995 | Aziz ............................ | 380/30 |
| 6,219,694 | B1 * | 4/2001 | Lazaridis et al. ............ | 709/206 |
| 6,393,463 | B1 | 5/2002 | Fuchigami | |
| 6,704,039 | B2 * | 3/2004 | Pena ....................... | 348/14.01 |
| 6,801,962 | B2 * | 10/2004 | Taniguchi et al. ............. | 710/33 |
| 6,983,370 | B2 * | 1/2006 | Eaton et al. ................. | 713/182 |
| 6,996,535 | B1 * | 2/2006 | Ono et al. ..................... | 705/26 |
| 7,376,701 | B2 * | 5/2008 | Bhargava et al. ............ | 709/206 |
| 7,428,575 | B1 * | 9/2008 | Motoyama ................... | 709/206 |
| 7,447,743 | B1 * | 11/2008 | Jordan, Jr. ................... | 709/206 |
| 2002/0049670 | A1 * | 4/2002 | Moritsu et al. ................ | 705/40 |
| 2002/0194307 | A1 * | 12/2002 | Anderson et al. ........... | 709/219 |
| 2002/0199001 | A1 * | 12/2002 | Wenocur et al. ............ | 709/227 |
| 2003/0088630 | A1 * | 5/2003 | Parry .......................... | 709/206 |
| 2003/0154398 | A1 * | 8/2003 | Eaton et al. ................. | 713/201 |
| 2004/0041849 | A1 * | 3/2004 | Mock et al. ................. | 345/867 |

FOREIGN PATENT DOCUMENTS

| | | |
|---|---|---|
| EP | 0 926 612 A2 | 6/1999 |
| JP | A 11-55451 | 2/1999 |
| JP | A 11-161585 | 6/1999 |

(Continued)

*Primary Examiner*—Khanh Q Dinh
(74) *Attorney, Agent, or Firm*—Oliff & Berridge, PLC

(57) ABSTRACT

In a communication system, a mail server and a plurality of electronic devices, which are connected with a network, are provided. A predetermined e-mail address is assigned to the plurality of electronic devices. Each of the plurality of electronic devices includes a first determination system that determines whether an e-mail address of an e-mail message transmitted to the mail server coincides with the predetermined e-mail address, a second determination system that determines, whether the e-mail message addressed to the predetermined e-mail address is directed to the electronic device to which the second determination system belongs in accordance with contents of the e-mail message addressed to the predetermined e-mail address, and a processing system that executes a procedure corresponding to the e-mail message when the second determination system determines that the e-mail message is directed to the electronic device to which the second determination system belongs.

20 Claims, 14 Drawing Sheets

FOREIGN PATENT DOCUMENTS

| | | |
|---|---|---|
| JP | A 11-196121 | 7/1999 |
| JP | A 11-205573 | 7/1999 |
| JP | A 11-239168 | 8/1999 |
| JP | A 11-331242 | 11/1999 |
| JP | A 2000-354115 | 12/2000 |
| JP | A 2002-111937 | 4/2002 |

* cited by examiner

FIG.3A

Received : from sample.com
   super.main @ sample.com ; Fri, 23 Aug 2002 22 : 27 : 38
Message-ID : < 3D663935.275DEA37 @ sample.com >
From : super.main @ sample.com ← 101
To : main @ sample.com ← 102
Subject : INFOMATION REQUEST ← 103
Date : Fri, 23 Aug 2002 22 : 31 : 33 + 0900
Mime-Version : 1.0
Content-Type : text/plain ;
    104a  104b
REQUEST DEVICE : BRX_001 ← 104

CONTENT : TONER, PAPER ← 105

END

FIG.3B

Received : from sample.com
   main @ sample.com ; Fri, 23 Aug 2002 22 : 29 : 38
Message-ID : < 3D663935.275DEA40 @ sample.com >
From : main @ sample.com ← 101
To : super.main @ sample.com ← 102
Subject : RE : INFOMATION REQUEST ← 103
Date : Fri, 23 Aug 2002 22 : 33 : 33 + 0900
Mime-Version : 1.0
Content-Type : text/plain ;
    106a  106b
REQUEST DEVICE : BRX_001 ← 106
TIME : 22 : 32 : 50-AUG. 23. 2000

TONER : 30 %
PAPER : 1878 ← 107

END

FIG. 5

Received : from XNET (localhost [127. 0. 0. 1])
        by xnet.sample.com (8. 9. 3/3. 7W-00000000) with SMTP id 00000000
        for < main@sample.com > ; Tue, 01 Oct 2005 10 : 10 : 10 + 0900 (JST)
From : super.main@sample.com ←~101
To : main@sample.com ←~102
Subject : Internet FAX Job ←~103
Date : Tue, 01 Oct 2005 10 : 10 : 10 + 0900
Message-Id : < 00000000. 2abcdef0. 1. 00 >
Mime-Version : 1.0
Content-Type : multipart/mixed ; ←~113
        boundary =" --++-- BrotherInternetFAX --++-- "

This is multipart message.

----++-- BrotherInternetFAX --++----
Content-Type : text/plain ; charset = us-ascii Image data in TIFF-F format has been attached. ←~111
----++-- BrotherInternetFAX --++----
Content-Type : image/tiff ; ←~114
      name = "image. tif"
Content-Transfer-Encoding : base64     ←~112

SUkqAAgAAAARAP4ABAABAAAAgAAAAABAwABAAAAwAYAAAEBAwABAAAA1QgAAAIBAwA
AQAAAAMBAwABAAAAwAAAAYBAwABAAAAAAAAAoBAwABAAAAAgAAABEBBAABAAAA6gA
AwABAAAAAQQQQBUBAwABAAAAAQAAABYBBAABAAAA1QgAAbcBBAABAAAAdDUAABoBBQA
      -- syncopated --
KwDKZgVAAyNaADQwogVA2awAKJsVAGWzAqBsVgAOMKIFQNmsACibFQANjGgBOMDIRQW
OMCIFgBIswKggREtABoYOQKgbFYANDCiBUDZrABoYEQLgLJZAVA2KwAaCNEAoGxWALS
WgAEQAAEQAAEQA==
----++-- BrotherInternetFAX --++----

FIG. 7

Received : from sample.com
        super.main @ sample.com ; Fri, 23 Aug 2002 22 : 27 : 38
Message-ID : < 3D663935.275DEA37 @ sample.com >
From : super.main @ sample.com ~101
To : main @ sample.com ~102
Subject : INFOMATION REQUEST ~103
Date : Fri, 23 Aug 2002 22 : 31 : 33 + 0900
Mime-Version : 1.0
Content-Type : text/plain ;

104a          104b
REQUEST DEVICE : BRX_001, BRN_001, BRN_002 ~104

CONTENT : TONER, PAPER ~105

END

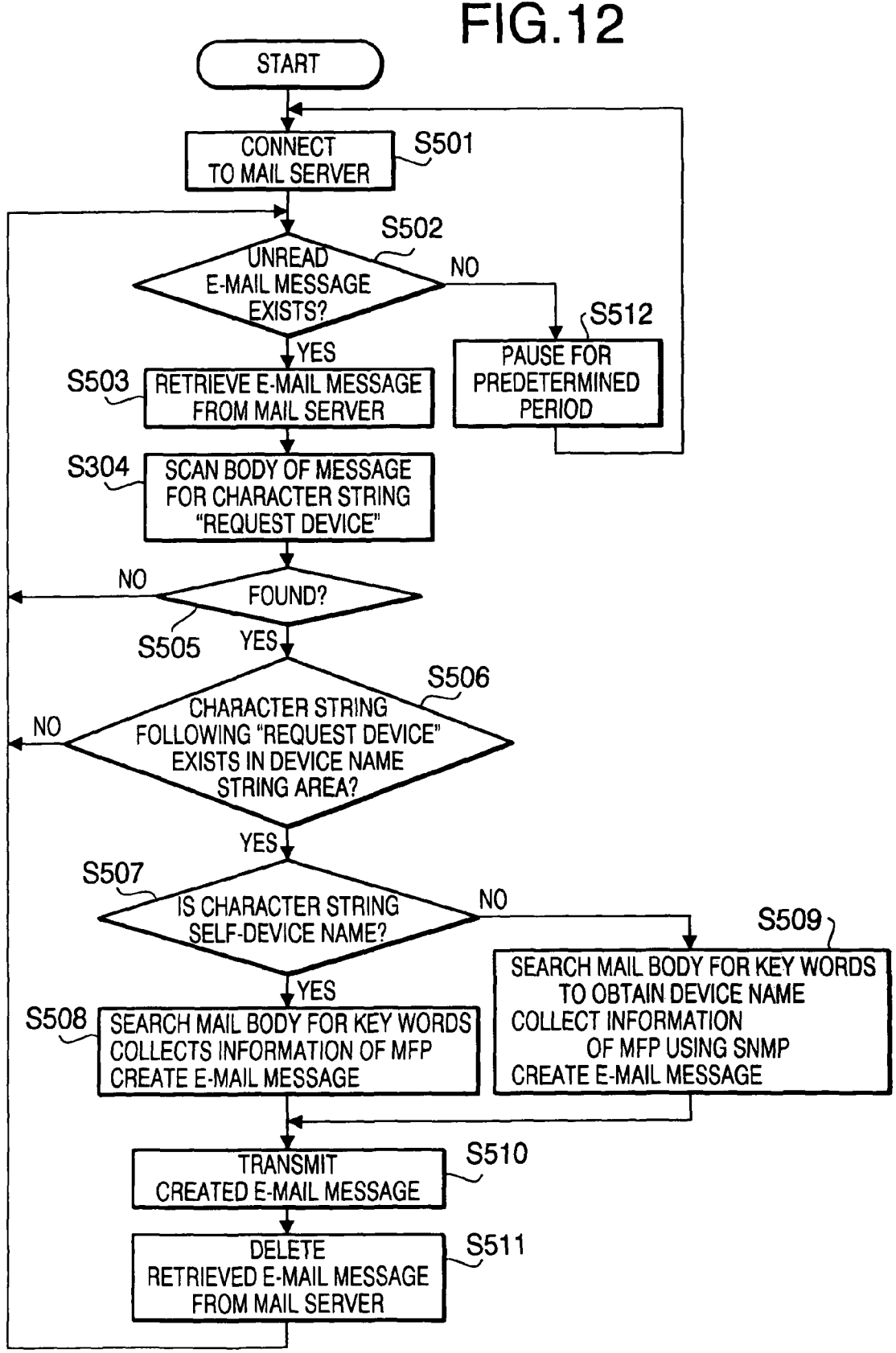

COMMUNICATION SYSTEM HAVING COMMON E-MAIL ADDRESS FOR PLURALITY OF DEVICES

BACKGROUND OF THE INVENTION

The present invention relates a communication system having a plurality of network devices connected to a network and obtaining e-mail messages directed to the network devices, respectively, from a mail server which is also connected to the network.

Conventionally, electronic devices each of which is configured to obtain e-mail messages directed thereto from a mail server have been known. An example of such electronic devices is an Internet facsimile device, which obtains an e-mail message attaching an image file from a mail server, and prints out the attached image file. Such a facsimile device is disclosed in Japanese Patent Application Provisional Publication HEI 11-205573.

In such an Internet facsimile device as disclosed in the above-identified publication, a unique e-mail address should be assigned to each device so that an e-mail message is directed to the one destination facsimile device. If a plurality of internet facsimile devices exist on a network (e.g., LAN), different e-mail addresses should be assigned to the plurality of the Internet facsimile devices, respectively. Therefore, when the number of the internet facsimile devices increases, troublesome work for assigning and setting the e-mail addresses should be performed, which results in increasing of the operation cost of such a network system.

SUMMARY OF THE INVENTION

The present invention is advantageous in that the e-mail messages are directed to their destinations correctly without assigning different e-mail addresses to a plurality of electronic devices existing on the network.

According to an aspect of the invention, there is provided an electronic device for a communication system having a mail server and a plurality of electronic devices which are connected with a network. A predetermined e-mail address is assigned to the plurality of electronic devices. Each of the plurality of electronic devices includes a first determination system that determines whether an e-mail address of an e-mail message transmitted to the mail server coincides with the predetermined e-mail address, a second determination system that determines whether the e-mail message addressed to the predetermined e-mail address is directed to the electronic device to which the second determination system belongs in accordance with contents of the e-mail message addressed to the predetermined e-mail address, and a processing system that executes a procedure corresponding to the e-mail message when the second determination system determines that the e-mail message is directed to the electronic device to which the second determination system belongs.

Optionally, each of the plurality of electronic device includes a destination device information obtaining system that obtains information of a destination device of the e-mail message in accordance with the contents of the e-mail message, the second determination system determining whether the e-mail message is directed to the electronic device to which the second determination system belongs in accordance with whether the information of the destination device designates the electronic device to which the second determination system belongs.

In a particular case, the information of the destination device designates the electronic device to which the second determination system belongs and at least one other electronic device, the information of the destination device designating the electronic device to which the second determination system belongs and the at least one other electronic device. Each of the plurality of electronic device includes an e-mail updating system that updates the e-mail message in the mail server by creating a modified e-mail message which is similar to the e-mail message except that the information of the destination device is modified such that the information designating the electronic device to which the second determination system belongs is deleted and transmits the modified e-mail message to the predetermined e-mail address and by deleting the e-mail message including the unmodified information and stored in the mail server, and an e-mail deleting system that deletes the e-mail message from the mail server when the information of the destination device obtained by the destination device information obtaining system only designates the electronic device to which the second determination system belongs to.

Optionally, the e-mail message includes a first character string having a predetermined character string followed by a second character string having information designating the destination device.

In a certain embodiment, the e-mail message has attached data to be processed, and each of the plurality of electronic device has data type obtaining system that obtains a data type of the attached data from the contents of the e-mail message. Further, the second determination system determines whether the e-mail message is directed to the electronic device to which the second determination system belongs based on whether the attached data can be processed by the electronic device.

In a particular case, processing of the attached data may be printing of the attached data.

In a certain case, the attached data is TIFF-F format data.

Further optionally, the electronic device may include an e-mail deleting system that deletes the e-mail message corresponding to the procedure executed by the processing system from the mail server.

Optionally, the electronic device may include an e-mail deleting system that deletes the e-mail message corresponding to the procedure executed by the processing system from the mail server predetermine period after the procedure has been executed.

Still optionally, the procedure executed by the processing system may include creation and transmission of a replying e-mail message replying to the e-mail message.

In this case, the e-mail message may optionally contain a request for a status of the electronic device, and the replying e-mail message may contain a status of the electronic device to which the processing system belongs.

Further optionally, in the communication system described above, the e-mail message may have attached data, and processing of the attached data may be printing of the attached data.

According to another aspect of the invention, there is provided a communication system having a mail server, an electronic devices and at least one terminal device which is managed by the electronic device, a predetermined e-mail address being assigned to the electronic device. The electronic device may include a first determination system that determines whether an e-mail address of an e-mail message transmitted to the mail server coincides with the predetermined e-mail address, a second determination system that determines whether the e-mail message addressed to the predetermined e-mail address is directed to one of the electronic device and the at least one of terminal device in accordance with contents of the e-mail message addressed to the predetermined e-mail address, and a processing system that executes a procedure corresponding to the e-mail message when the second determination system determines that the e-mail message is directed to one of the electronic device and the at least one terminal device.

Optionally, the electronic device includes a destination device information obtaining system that obtains information of a destination device of the e-mail message in accordance with the contents of the e-mail message, the second determination system determining whether the e-mail message is directed to the electronic device or the at least one terminal device in accordance with the information of the destination device.

Further optionally, the communication system may be provided with an e-mail deleting system that deletes the e-mail message corresponding to the procedure executed by the processing system from the mail server.

Still optionally, the communication system may include an e-mail deleting system that deletes the e-mail message corresponding to the procedure executed by the processing system from the mail server predetermine period after the procedure has been executed.

Furthermore optionally, the procedure executed by the processing system may include creation and transmission of a replying e-mail message replying to the e-mail message.

In a certain case, the e-mail message may optionally contain a request for a status of the electronic device, and the replying e-mail message may contain a status of the electronic device to which the processing system belongs.

Specifically, the e-mail message may contain a request for a status of the designating device, and the electronic device obtains status information of the at least one terminal device in accordance with a predetermined communication protocol when the request is for the status of the at least one terminal device. Further, the replying e-mail message may contain a status of one of the electronic device and the at least one terminal device.

According to another aspect of the invention, there is provided an electronic device for a communication system having a mail server and a plurality of electronic devices which are connected with a network, a predetermined e-mail address being assigned to the electronic device. The electronic device may include a first determination system that determines whether an e-mail address of an e-mail message transmitted to the mail server coincides with the predetermined e-mail address, a second determination system that determines whether the e-mail message addressed to the predetermined e-mail address is directed to the electronic device in accordance with contents of the e-mail message addressed to the predetermined e-mail address, and a processing system that executes a procedure corresponding to the e-mail message when the second determination system determines that the e-mail message is directed to the electronic device.

According to a further aspect of the invention, there is provided an electronic device for a communication system having a mail server, an electronic devices and at least one terminal device which is managed by the electronic device, a predetermined e-mail address being assigned to the electronic device. The electronic device may include a first determination system that determines whether an e-mail address of an e-mail message transmitted to the mail server coincides with the predetermined e-mail address, a second determination system that determines whether the e-mail message addressed to the predetermined e-mail address is directed to one of the electronic device and the at least one of terminal device in accordance with contents of the e-mail message addressed to the predetermined e-mail address, and a processing system that executes a procedure corresponding to the e-mail message when the second determination system determines that the e-mail message is directed to one of the electronic device and the at least one terminal device.

According to a furthermore aspect of the invention, there is provided a computer program product that controls a computer to function as an electronic device for a communication system having a mail server and a plurality of electronic devices which are connected with a network, a predetermined e-mail address being assigned to the electronic device. The computer program product may include the instructions of (a) determining whether an e-mail address of an e-mail message transmitted to the mail server coincides with the predetermined e-mail address, (b) determining whether the e-mail message addressed to the predetermined e-mail address is directed to the electronic device in accordance with contents of the e-mail message addressed to the predetermined e-mail address, and (c) executing a procedure corresponding to the e-mail message when it is determined that the e-mail message is directed to the electronic device.

According to another aspect of the invention, there is provide a computer program product that controls a computer to function as an electronic device for a communication system having a mail server, an electronic devices and at least one terminal device which is managed by the electronic device, a predetermined e-mail address being assigned to the electronic device. The computer program product may include the instructions of (a) determining whether an e-mail address of an e-mail message transmitted to the mail server coincides with the predetermined e-mail address, (b) determining whether the e-mail message addressed to the predetermined e-mail address is directed to one of the electronic device and the at least one of terminal device in accordance with contents of the e-mail message addressed to the predetermined e-mail address, and (c) executing a procedure corresponding to the e-mail message when it is determined that the e-mail message is directed to one of the electronic device and the at least one terminal device.

According to another aspect of the invention, there is provided a computer for a communication system having a mail server and a plurality of electronic devices which are connected with a network, the computer being connected with the mail server. The computer may include an e-mail creating system that creates an e-mail message, the e-mail message being addressed to an e-mail addressed which is commonly used by the plurality of electronic devices, an electronic device selecting system that enables an operator of the computer to select at least one of the plurality of electronic devices, information indicative of the selected one of the plurality of electronic devices being inserted in the e-mail message, and an information designating system that enables the operator to designate information to be obtained from the selected at least one of the plurality of electronic devices, information indicative of the designated information being inserted in the e-mail message. With this configuration, the communication system may be configured such that only the designated at least one of the plurality of electronic device processes the e-mail message, the e-mail message being transmitted to the mail server.

Optionally, the communication system may be configured such that, when the mail server receives the e-mail message including the information indicative of the designating at least one of the plurality of electronic devices and information indicative of the designated information, a replying e-mail message containing a status in terms of the designated information of the designated at least one of the plurality of electronic devices being transmitted to the computer.

In particular, the computer configured as above may further include a display, a visual interface being provided so as to display a window on the display, the window allowing the operator to select at least one of the plurality of electronic devices sharing the common e-mail address, the visual interface inserting information indicative of the selected at least one of the plurality of electronic devices in the e-mail message.

In a certain case, the window displayed on the display may allow the operator to select one or more pieces of information to be obtained from the designated one of the plurality of electronic devices, the visual interface inserting information indicative of the one or more pieces of information to be obtained from the designated at least one of the plurality of electronic devices in the e-mail message.

According to a still another aspect of the invention, there is provided a computer program product that controls a computer to function as an electronic device for a communication system having a mail server and a plurality of electronic devices which are connected with a network, a predetermined e-mail address being assigned to the electronic device. The computer program product may include the instructions of determining whether an e-mail address of an e-mail message transmitted to the mail server coincides with the predetermined e-mail address, determining whether the e-mail message addressed to the predetermined e-mail address is directed to the electronic device in accordance with contents of the e-mail message addressed to the predetermined e-mail address, and executing a procedure corresponding to the e-mail message when it is determined that the e-mail message is directed to the electronic device.

According to a further aspect of the invention, there is provided another computer program product that controls a computer to function as an electronic device for a communication system having a mail server, an electronic devices and at least one terminal device which is managed by the electronic device, a predetermined e-mail address being assigned to the electronic device. The computer program product may include the instructions of determining whether an e-mail address of an e-mail message transmitted to the mail server coincides with the predetermined e-mail address, determining whether the e-mail message addressed to the predetermined e-mail address is directed to one of the electronic device and the at least one of terminal device in accordance with contents of the e-mail message addressed to the predetermined e-mail address, and executing a procedure corresponding to the e-mail message when it is determined that the e-mail message is directed to one of the electronic device and the at least one terminal device.

The systems and devices according to the present invention can be realized when appropriate programs provided and executed by a personal computer. Such programs may be stored in recording medium such as a flexible disk, CD-ROM, memory cards and the like and distributed. Alternatively or optionally, such programs can be distributed through networks such as the Internet.

BRIEF DESCRIPTION OF THE ACCOMPANYING DRAWINGS

FIGS. 3A and 3B show examples of e-mail messages transmitted in the communication system shown in FIG. 1;

FIG. 5 shows an example of an e-mail message transmitted in the communication system shown in FIG. 1;

FIG. 7 shows an example of an e-mail message transmitted in the communication system shown in FIG. 1;

FIG. 12 is a flowchart illustrating an e-mail obtaining procedure according to a fifth embodiment.

DESCRIPTION OF THE EMBODIMENTS

Hereinafter, with reference to the accompanying drawings, embodiments of the invention will be described.

First Embodiment

Figure 1:
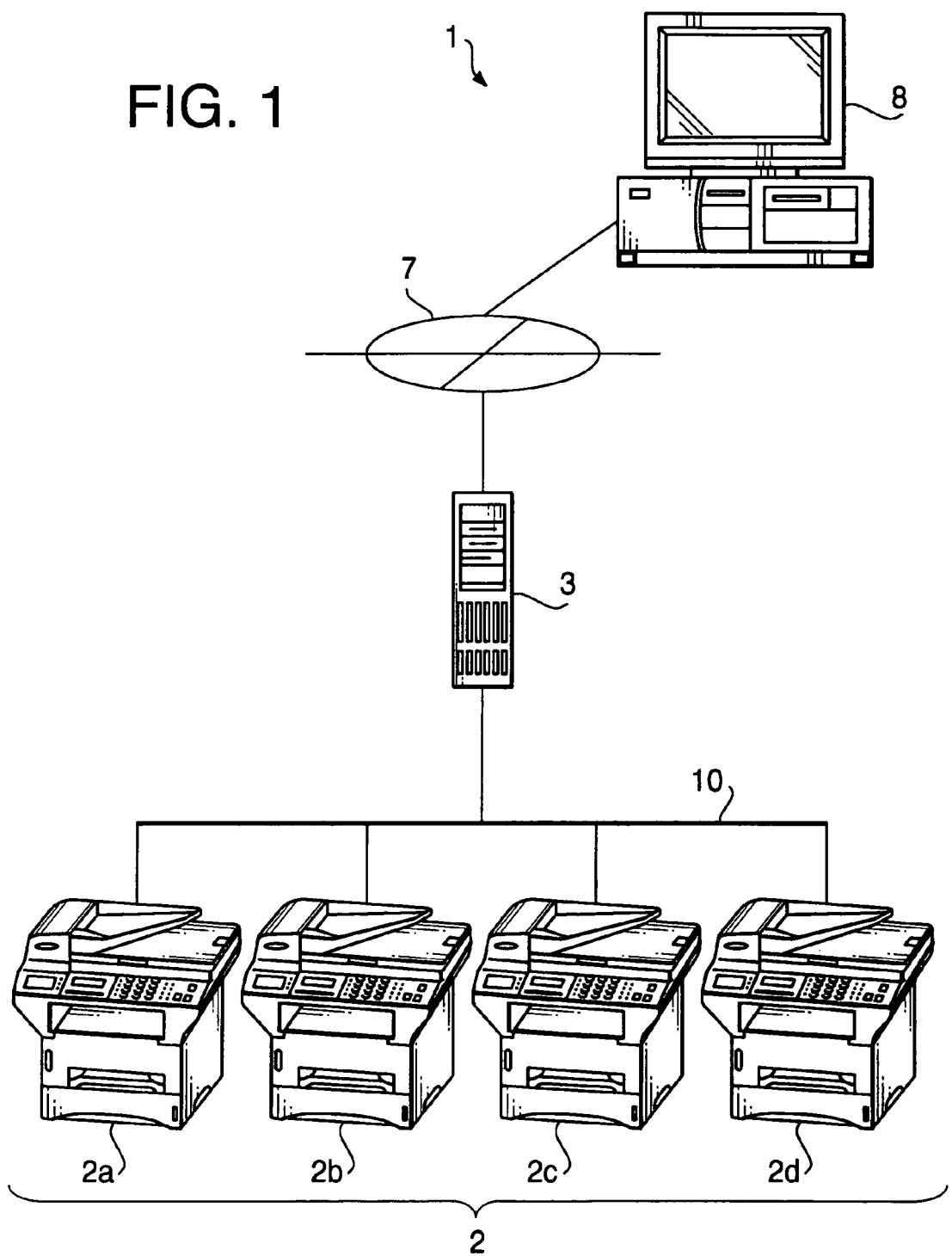
FIG. 1 shows a configuration of a communication system to which first through fourth embodiments of the invention can be applied.
Figure 2A:
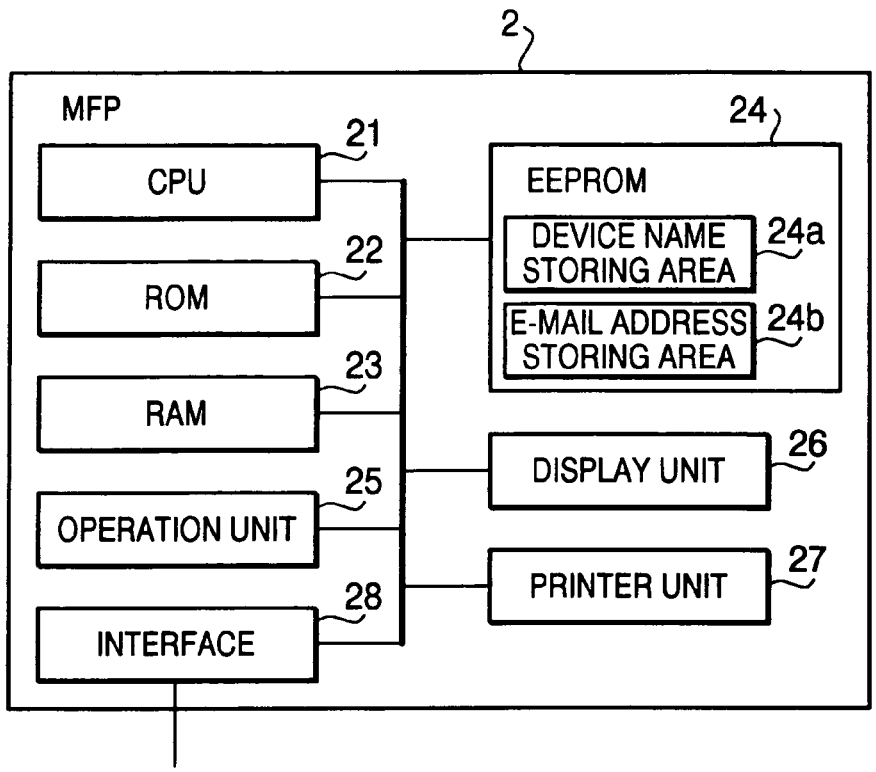
FIGS. 2A, 2B and 2C show block diagrams of an MFP (Multi-function peripheral), a mail server and a personal computer included in the communication system shown in FIG. 1.
Figure 2B:
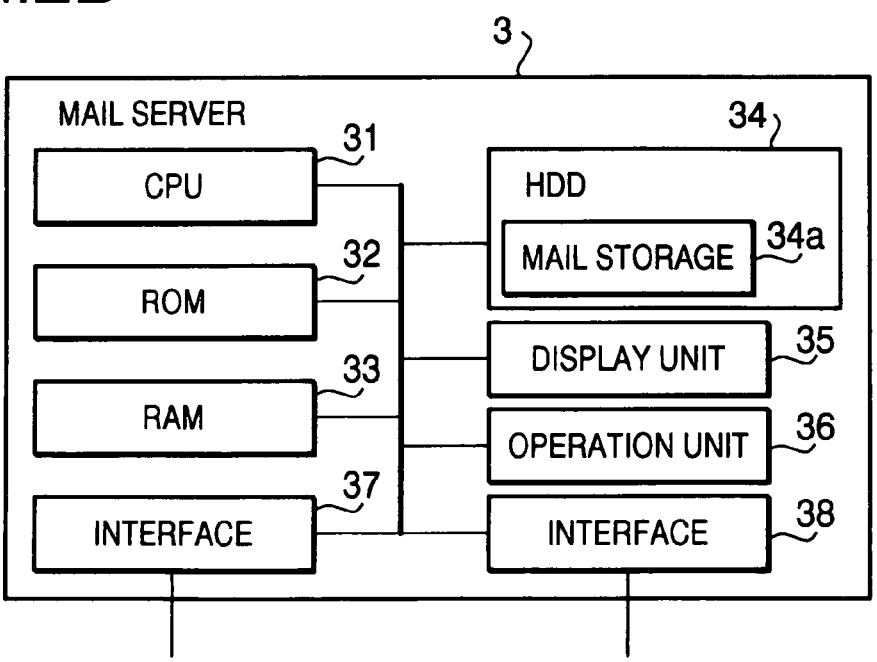

FIG. 1 shows a configuration of a communication system 1 to which the first embodiment of the invention can be applied. FIGS. 2A and 2B show block diagrams of an MFP (Multi-function peripheral) 2 and a mail server 3 included in the communication system shown in FIG. 1. In this example, since the MFPs 2a-2d have the same configuration, each of the MFPs 2a-2d is represented by a reference numeral 2 (two). That is, in the following description, the MFP 2 represents each of the MFPs 2a-2d.

The communication system 1 is configured such that, as shown in FIG. 1, a personal computer 8 and the mail server 3 are connected through the Internet 7. Further, the MFPs 2 (2a-2d) and the mail server 3 are connected to a LAN (Local Area Network) 10 so as to be communicable with each other. Each of the MFPs 2a-2d has a function of obtaining e-mail messages directed to the address assigned thereto from the mail server 3. Further, each of the MFPs 2a-2d is capable of printing TIFF-F format image data.

Importantly, the MFPs 2a-2d are assigned with the same e-mail address (which will be referred to as a common e-mail address), which is "main@sample.com", and different device names. In this example, for the MFPs 2a, 2b, 2c and 2d, device names of BRN_001, BRX_001, BRN_002 and BRX_002 are assigned, respectively.

According to the embodiments, when the personal computer 8 transmits an e-mail message to the MFP 2a, for example, the e-mail message is addressed to the common e-mail address "main@sample.com", and the device name of the MFP 2a (i.e., BRN_001) is described in the body of the e-mail message. The e-mail messages directed to the MFPs 2b-2d are to be created in the similar manner.

In the communication system 1, an operation as follows is performed.

An administrator of the communication system 1 or a user thereof may need to know remaining amount of toner and/or consumed amount of recording sheet of each of the MFPs 2a-2d. In such a case, the administrator or the user transmits an e-mail message inquiring the remaining amount of the toner and the consumed amount of the recording sheet from the personal computer 8 to the MFP 2 (i.e., to each of the MFPs 2a-2d). Then, the MFP 2 transmits, in response to the receives e-mail message, an e-mail message containing the remaining toner amount and the consumed amount of the recording sheet to an e-mail address of the administrator, which is in this example "super.main@sample.com". The administrator or the user may also transmit data to be printed from the personal computer 8 to the MFP 2. Then, the MFP 2 (i.e., the desired one of the MFPs 2a-2d) receives the data to be printed, and prints out the data.

FIGS. 2A and 2B show block diagrams of the MFP and the mail server 3 included in the communication system 1.

The MFP 2 has, as shown in FIG. 2A, a CPU (central processing unit) 21, a ROM (read only memory) 22, a RAM (random access memory) 23, an EEPROM (electrically erasable programmable ROM) 24, an operation unit 25, a display unit 26, a printer unit 27 and an interface 28.

The CPU 21 executes various operations and procedures. According to the first embodiment, the CPU 21 reads out an e-mail obtaining program from the ROM 22 when, for example, the MFP 2 is powered ON, and executes the e-mail obtaining procedure, which will be described later.

The ROM 22 is a read only memory, and functions as a part of a main memory of the MFP 2. The ROM 22 stores various programs such as a system program and an e-mail message obtaining program to be executed by the CPU 21. The RAM 23 is a readable/writable volatile memory. The RAM 23 also functions as a part of the main memory of the CPU 21, and has a work area storing intermediate results of data processing executed by the CPU 21.

The EEPROM 24 is a readable/writable non-volatile memory, which retains data stored therein even when it is powered OFF. The EEPROM 24 has a device name storing area 24a storing a device name intrinsic to the MFP 2 (i.e., BRN_001 for MFP 2a, BRX_002 for MFP 2b, BRN_002 for MFP 2c and BRX_002 for MFP 2d), and a common e-mail address storing area 24b storing the common e-mail address (i.e., "main@sample.com").

The operation unit 25 is used for inputting data and/or commands in the MFP 2. Typically, the operation unit 25 is provided with a keyboard having a predetermined number of keys, and a touch panel provided on a screen of the display unit 26. The display unit 26 displays various information on the screen. Typically, the display unit 26 includes an LCD or plasma display. The LCD may be a simple matrix type such as an STN type of a DSTN type, or an active matrix type such as a TFT type. The printer unit 27 provides a monochromatic or color printer function. The interface 28 connects the MFP 2 to the LAN 10 so that the MFP 2 can communicate with devices connected to the LAN 10.

The mail server 3 includes, as shown in FIG. 2B, a CPU 31, a ROM 32, a RAM 33, an HDD 34, a display unit 35, an operation unit 36, and interfaces 37 and 38.

The CPU 31 executes various operations. For example, the CPU 31 stores the e-mail messages transmitted from the personal computer 8 and/or the MFP 2 in a mail storage 34a of the HDD 34, and provides the same upon requests from the MFP 2. The CPU 31 can erase the e-mail messages stored in the mail storage 34a upon a request by the MFP 2.

The ROM 32 is a read-only memory, which functions as a part of the main memory of the mail server 3. The ROM 32 stores various programs including a system program to be executed by the CPU 31. The RAM 33 is a readable/writable volatile memory, which also functions as a part of the main memory of the mail server 3. The RAM 33 has a work area for storing intermediate results of data processing. The HDD 34 is a readable/writable data storage (i.e. a hard disk) and a reading/writing device thereof. The HDD 34 includes the mail storage 34a for storing the e-mail messages transmitted to the mail server 3.

The display unit 35 is a device for display various information on the display. The display unit 35 typically includes an LCD or plasma display. The operation unit 36 is used for inputting data/command in the mail server 3. The operation unit 36 typically includes a keyboard having a plurality of keys and a pointing device such as a mouse. The interface 37 connects the mail server 3 to the LAN 10 so as to enable the communication with the devices connected to the LAN 10. The interface 38 connects the mail server 3 to the Internet 7 so as to enable the communication with devices connected to the Internet 7.

Figure 2C:
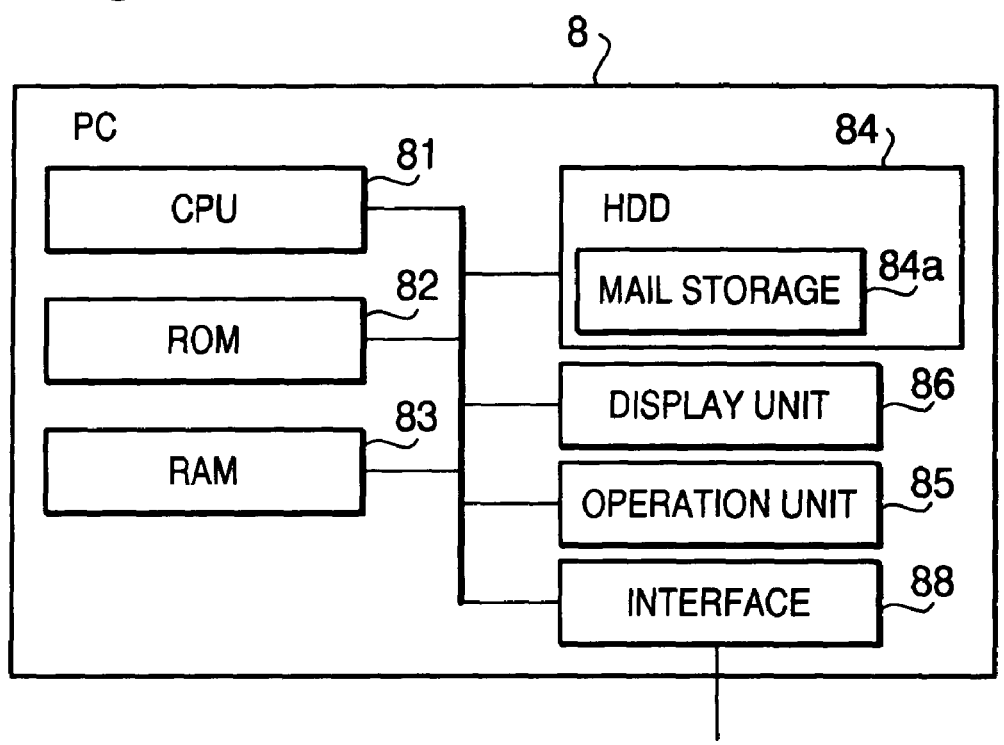

FIG. 2C is a block diagram of the personal computer (PC) 8. As shown in FIG. 2C, the personal computer 8 has a CPU (central processing unit) 81, a ROM (read only memory) 82, a RAM (random access memory) 83, an HDD (hard disk drive) 84 including a mail storage 84a, an operation unit 85, a display unit 86 and an interface 88.

The CPU 81 executes various operations and procedures. In particular, the CPU 81 operates to display an information request window on the display 86 so that the user of the personal computer 8 input a request for information of the MFP 2, which is transmitted to the mail server 3 as an e-mail message.

The ROM 82 is a read only memory, and functions as a part of a main memory of the personal computer 8. The ROM 82 stores various programs. The RAM 83 is a readable/writable volatile memory. The RAM 83 also functions as a part of the main memory of the CPU 81, and has a work area storing intermediate results of data processing executed by the CPU 81.

The HDD 84 is a readable/writable data storage, which stores various data and programs including the aforementioned e-mail message creating and sending program.

The operation unit 85 is used for inputting data and/or commands in the personal computer 8. Typically, the operation unit 85 is provided with a keyboard and a mouse. The display 86 displays various information on the screen. Typically, the display unit 86 includes an LCD or plasma display. The LCD may be a simple matrix type such as an STN type of a DSTN type, or an active matrix type such as a TFT type. The interface 88 connects the personal computer to the Internet 7, thereby the personal computer 8 can transmit an e-mail message to the mail server 3 through the Internet 7.

Next, an example of an e-mail message transmitted, by the system administrator or the user, from the personal computer 8 to the MFP 2, and a replaying e-mail message transmitted from the MFP 2 to the system administrator or the user will be described with reference to FIGS. 13, 3A and 3B.

Figure 13:
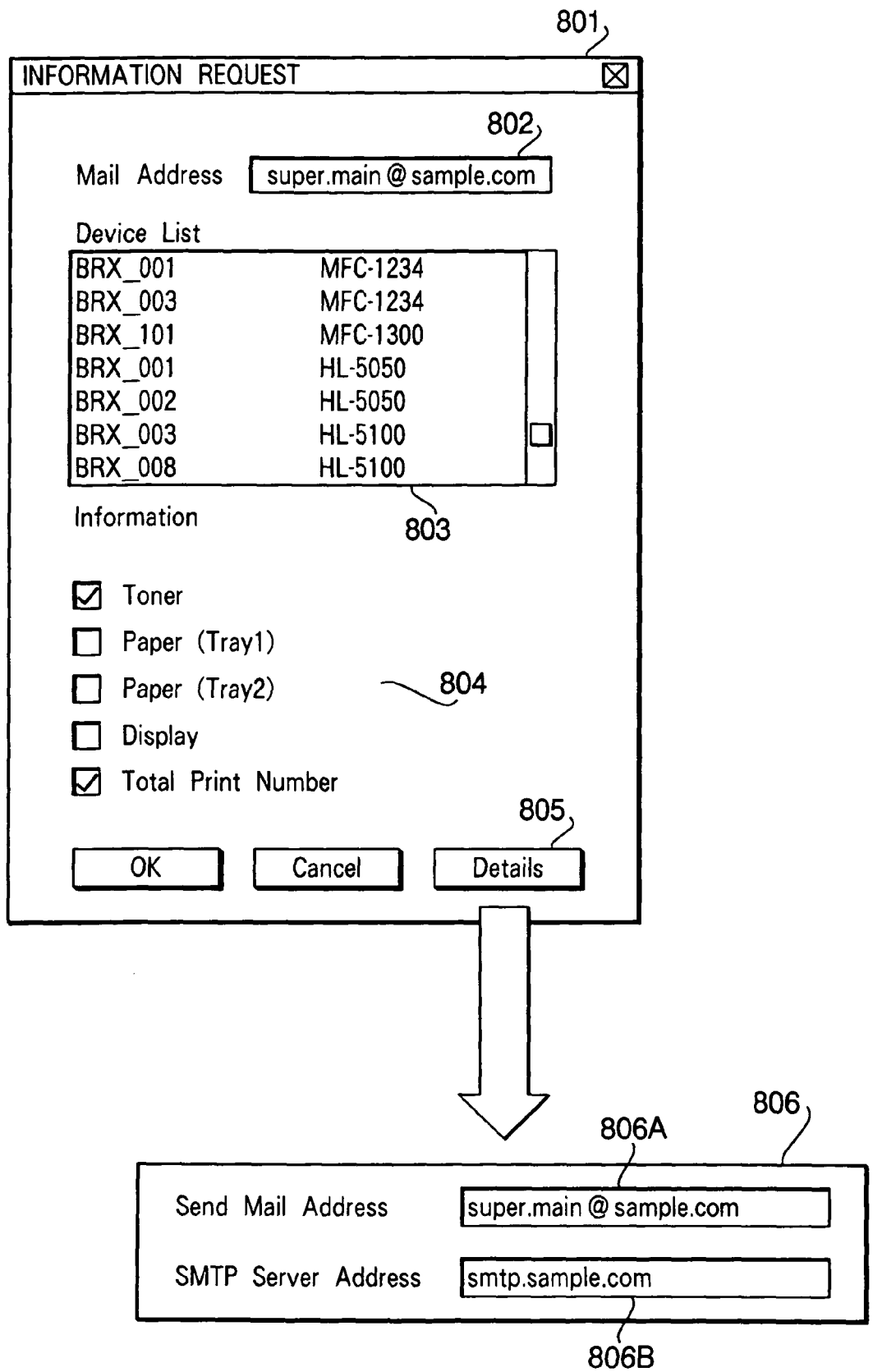
FIG. 13 is an example of an information request window displayed on the personal computer.

FIG. 13 shows the information request window 801 which is displayed on the display 86 provided to the personal computer 8. As shown in FIG. 13, using the information request window 801 as an interface, the operator of the personal computer 8 can create an e-mail message to be transmitted to the MFP 2, requesting various pieces of information of the MFP 2.

Specifically, the information request window has a mail address input box 802 in which the e-mail address of a sender is input. The e-mail message will be created by the system administrator or the user, as described above. In the example shown in FIG. 13, the e-mail address reads "super.main@sample.com", which is the e-mail address of the administrator.

The information request window 801 includes a device list box 803, in which a list of MFPs accessible from the PC 8 is displayed. The user of the PC 8 can select one of the MFP in the list shown in the device list box 803, and one or more pieces of information 804 listed below the device list box 803 is selected.

Then, by clicking the "OK" button in the information request window 801, an e-mail message requesting for information of the selected MFP is automatically generated, and is transmitted to the mail server 3 through the Internet 7. When detailed information of the e-mail setting of the user of the PC 8 is to be input, by clicking the "Details" button 805, another window 806 is displayed, in which the user can input a sender's e-mail address and an SMTP server address in input boxes 806A and 806B, respectively.

In the above configuration, the personal computer 8 functions as a server for transmitting e-mail messages. When the personal computer 8 receives an e-mail message addressed to the MFP 2 (2a, 2b, 2c or 2d), the personal computer 8 forwards the received e-mail message to the mail server 3, thereby the mail transmission from the personal computer 8 to the MFP 2 is realized. It should be noted that the configuration of the computer 8 is substantially similar to that of the mail server 3.

It should be noted that, in the above example, the personal computer 8 is located on the network 7. However, the configuration can be modified such that the personal computer 8 is on the network 10 as well as the MFPs 2 (i.e., 2a, 2b, 2c and 2d), and the communication between the personal computer and the MFPs 2 is realized using the mail server 3 as the SMTP server.

FIG. 3A shows an example of an e-mail message transmitted, by the system administrator or the user, from the personal computer 8 to the MFP 2b, and FIG. 3B shows an example of an e-mail message transmitted from the MFP 2b to the system administrator in response to the message shown in FIG. 3A.

In FIGS. 3A and 3B, character strings 101 represent senders' e-mail addresses from which the e-mail messages are transmitted. In FIG. 3A, since the e-mail message is transmitted by the system administrator or the user, the character string 101 indicates "From:super.main@sample.com", which represents that the e-mail message is transmitted by the system administrator or the user whose e-mail address is "super.main@sample.com". In FIG. 3B, since the e-mail message is transmitted by the MFP 2b, the character string indicates "From:main@sample.com", which represents the e-mail address (i.e., the common address) of the MFP 2b.

Character strings 102 represent destination e-mail addresses (i.e., the e-mail address of the MFP 2 or the e-mail address of the system administrator or the user). Since the e-mail message shown in FIG. 3A is directed to the MFP 2b, the character string 102 indicates "To:main@sample.com", which represents the common e-mail address for the MFPs 2. The e-mail message shown in FIG. 3B is directed to the system administrator of the user, and therefore, the character string 102 indicates "To:super.main@sample.com" which is the e-mail address of the system administrator or the user.

Character strings 103 represent subjects of the e-mail messages. As shown in FIG. 3A, when an e-mail message is a request for information (e.g., the remaining toner amount, and the consumed amount of the recording sheet) of the destination device to which the e-mail message is directed, the character string 103 indicates "Subject:INFORMATION REQUEST" as shown in FIG. 3A. When an e-mail message is a reply to such a request, the character string 103 may be configured as "Subject: RE:INFORMATION REQUEST" as shown in FIG. 3B.

A character string 104 represents a device name of a destination device. Specifically, the character string 104 consists of a first character string 104a ("REQUEST DEVICE") followed by a second character string 104b ("BRX_001") which represents a destination device to which the e-mail message is to be transmitted. As described above, the character string "BRX_001" represents the MFP 2b.

A character string 105 represents the requesting information. Specifically, as shown in FIG. 3A, the character string 105 includes a character string of "CONTENT:" followed by a character string representing the requesting information. In the example of FIG. 3A, a character string of "TONER, PAPER" follows the character string of "CONTENT:". In this example, "TONER" represents the remaining amount of the toner, and "PAPER" represents the consumed amount of the recording sheet.

A character string 106 represents a name of a device which transmits the e-mail message. Specifically, the character string 106 includes a character string 106a ("REQUEST DEVICE") followed by a character string 106b representing the device name ("BRX_001"). In this example, since the MFP 2b transmits the e-mail message shown in FIG. 3B, "BRX_001" is indicated as the character string 106b.

Character strings 107 represent the information as requested. In the examples shown in FIGS. 3A and 3B, since the remaining toner amount and the consumed amount of the recording sheet are requested (see character string 105), the character strings 107 indicate the remaining toner amount and the consumed recording sheet of the MFP 2b. In the example shown in FIG. 3B, the remaining amount of the toner is 30% and the consumed amount of the recording sheet is 1878 sheets.

Hereinafter, an e-mail obtaining procedure performed in the communication system 1 will be described with reference to FIG. 4.

Figure 4:
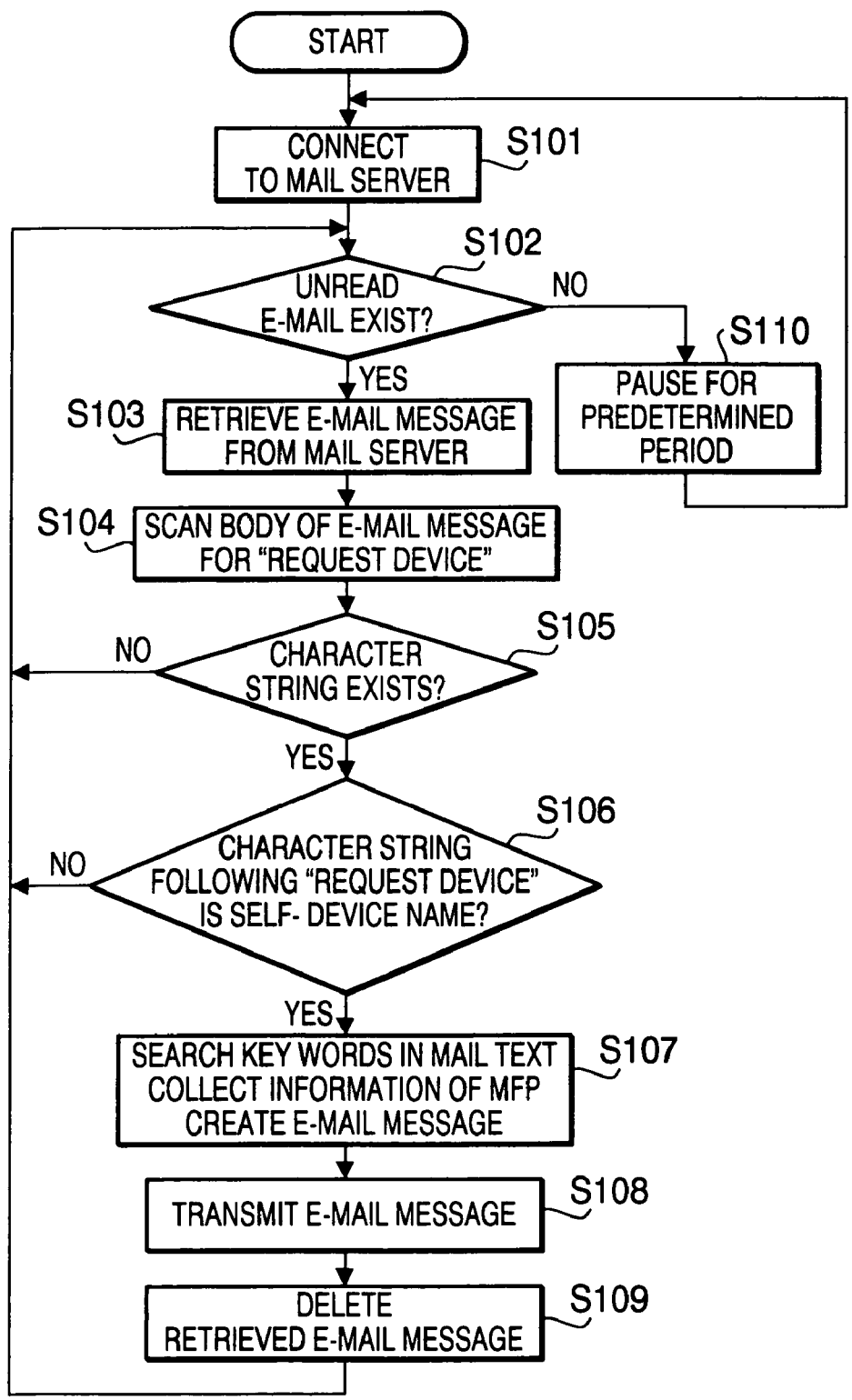
FIG. 4 is a flowchart illustrating an e-mail obtaining procedure according to a first embodiment.

FIG. 4 is a flowchart illustrating the e-mail obtaining procedure performed by the MFP 2 according to a first embodiment. The procedure is initiated when, for example, the MFP 2 is powered ON, and the CPU 21 of the MFP 2 retrieves an e-mail obtaining program from the ROM 22 and executes the same. It should be noted that the MFPs 22a-22d execute the e-mail obtaining procedure shown in FIG. 4 individually.

In S101, the CPU 21 connects the MFP 2 with the mail server 3. Next, the CPU 21 inquires the mail server 3 whether there are e-mail messages addressed to the common e-mail address and have not yet been read in the e-mail message storage 34a of the HDD 34 of the mail server 3. It should be noted that the common e-mail address is stored in a common e-mail address storing area 24b of the EEPROM 24. Then, based on the result of the inquiry, the CPU 21 determines whether there is an e-mail message to be read in S102. When the CPU 21 determines that the is an e-mail message to be read (S102: YES), control proceeds to S103. When the CPU 21 determines that there is no e-mail message to be read (S102: NO), control proceeds to S110.

In S110, the CPU 21 pauses for a predetermined period (e.g., a period set by the user), and then control returns to S101.

When the CPU 21 determines that there is an e-mail message to be read in the mail server 3 (S102: YES), the CPU 21 controls the MFP 2 to retrieve one e-mail message, which has not yet been read, from the e-mail storage 34a of the HDD 34 of the mail server 3 in S103. At this stage, a copy of the e-mail message, which has been retrieved, is remained in the mail server 3.

It should be noted that, in S103, the MFP 2 retrieves all the e-mail messages directed to the common e-mail address. For example, the e-mail message shown in FIG. 3A is directed to the MFP 2b. However, since the destination address of the e-mail message is the common e-mail message, all the MFPs 2a-2d retrieve the e-mail message in S103 regardless whether the device name indicated in the body of the e-mail message meets the device name of the MFP 2.

In S104, the CPU 21 scans the body of the e-mail message retrieved in S103 for the character string 104a ("REQUEST DEVICE").

When the body of the e-mail message includes the character string 104a ("REQUEST DEVICE") (S105: YES), control proceeds to S106. When the character string 104a is not included in the e-mail message (S105: NO), control returns to S102.

When the character string 104a is included in the body of the e-mail message (S105: YES), the CPU 21 determines whether the character string 104b which follows the character string 104a coincides with the device name that is stored in the device name storing area 24a of the EEPROM 24. When the CPU 21 determines that the character string 104b coincides with the device name (S106: YES), control proceeds to S107. When the character string 104b is different from the device name stored in the device name storing area 24a (S106: NO), control returns to S102.

For example, if the e-mail retrieved in S103 is similar to that shown in FIG. 3A, the CPU 21 of each of the MFPs 2a, 2c and 2d determines in S106 that the character string 104b does not coincide with the device name stored in the device name storing area 24a (S106: NO), and control returns to S102. The CPU 21 of the MFP 2b determines that the character string 104b coincides with the device name (S106: YES), and control proceeds to S107.

As described above, firstly, whether the address of the e-mail message stored in the mail server 3 is the common e-mail address is determined, and when the e-mail address is the common e-mail address, it is further determined whether the character string 104b in the e-mail message coincides with the device name.

When it is determined that the character string 104b coincides with the device name (S106: YES), that is, when the e-mail message is directed to the MFP 2 which is currently executing the procedure, the CPU 21 detects key words (e.g., the character string 105 in FIG. 3A) in the body of the e-mail message, and collects the information of the MFP 2 corresponding to the key words as detected (e.g., the remaining toner amount and the consumed recording sheets in FIG. 3A). Then, the CPU 21 creates an e-mail message for reply as shown in FIG. 3B based on the contents of the e-mail message retrieved in S103 and the information collected in S107, and control proceeds to S108.

In S108, the CPU 21 controls the MFP 2 to transmits the e-mail message created in S107 to the e-mail address that is indicated in the character string 101 of the e-mail message retrieved in S103. Then, control proceeds to S109.

In S109, the CPU 21 controls the MFP 2 to delete the copy of the e-mail message retrieved in S103 from the mail server 3. Then, control proceeds to S102.

According to the communication system 1 employing the e-mail message obtaining procedure according to the first embodiment, each of the MFPs 2a-2d determines that an e-mail message is directed thereto when the e-mail address of the e-mail message is the common e-mail message, and the character string 104b following the character string 104a ("REQUEST DEVICE:") represents the device name thereof. Therefore, it is not necessary to assign different e-mail addresses to the plurality of MFPs, and each e-mail message is received only by the destination device.

Further, according to the above procedure, each of the MFPs 2a-2d delete the e-mail message directed thereto after the e-mail message is received. Therefore, the e-mail messages which have already been read are not remained in the mail server 3, which reduces the load to the mail server 3.

Second Embodiment

Hereinafter, the communication system according to the second embodiment will be described. The second embodiment has the same hardware configuration as the first embodiment. Accordingly, the configuration of the communication system 1 according to the second embodiment is similar to that in FIG. 1, and the MFP 2 and the mail server 3 according to the second embodiment are similar to those shown in FIGS. 2A and 2B.

Figure 6:
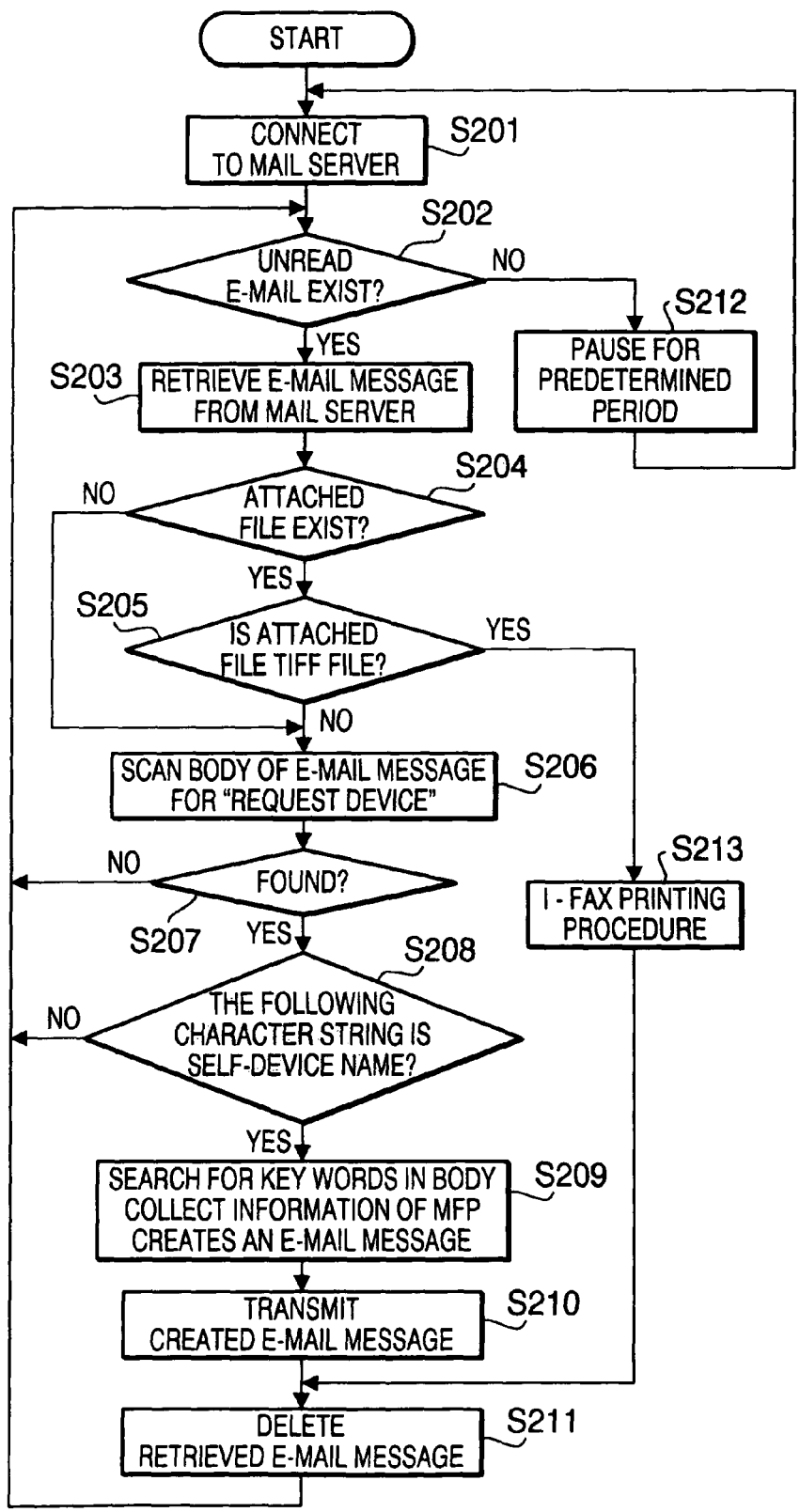
FIG. 6 is a flowchart illustrating an e-mail message obtaining procedure according to a second embodiment.

According to the second embodiment, the CPU 21 reads out an e-mail obtaining program from the ROM 22 when the MFP 2 is powered ON, for example, and executes an e-mail obtaining procedure shown in FIG. 6. It should be noted that the ROM 22 stores various programs including the e-mail obtaining program mentioned above to be executed by the CPU 21.

FIG. 5 shows an example of an e-mail message transmitted from the personal computer 8 to the MFP 2 according to the second embodiment. The e-mail message shown in FIG. 5 includes a text data section 111 and an attached file section 112 which represents data of a file attached to the e-mail message. In this example, the character string 103 "Subject: INTERNET FAX Job" represents that the attached file is to be printed in accordance with the Internet facsimile function.

A character string 113 ("Content-Type: multipart/mixed;") represents that a file is attached to the e-mail message. It should be noted that, when no file is attached to the e-mail message, the character string 113 ("Content-Type: multipart/mixed") is not included in the e-mail message.

As indicated in FIG. 5, a character string 114 indicative of a type of the attached file is included in the attached file section 112. When the Internet facsimile function is utilized, the TIFF-F file is attached to the e-mail message, and in this case, the character string 114 is set to "Content-Type: image/tiff" as shown in FIG. 5.

Next, the e-mail obtaining procedure performed in the communication system 1 according to the second embodiment will be described with reference to FIG. 6. FIG. 6 is a flowchart illustrating the e-mail message obtaining procedure, executed by the CPU 21, according to the second embodiment. As described above, the procedure shown in FIG. 6 is started when, for example, the MFP 2 is powered ON, as the CPU 21 retrieves the e-mail obtaining program from the ROM 22 and executes the same. Similarly to the first embodiment, the MFPs 2a-2d execute the e-mail obtaining procedure shown in FIG. 6, respectively.

In S201, the CPU 21 control the MFP 2 to connect with the mail server 3. Next, the CPU 21 inquires the mail server 3 whether there are e-mail messages addressed to the common e-mail address and have not yet been read in the e-mail message storage 34a of the HDD 34 of the mail server 3. It should be noted that the common e-mail address is stored in the common e-mail address storing area 24b of the EEPROM 24. Then, based on the result of the inquiry, the CPU 21 determines whether there is an e-mail message to be read in S202. When the CPU 21 determines that the is an e-mail message to be read (S202: YES), control proceeds to S203. When the CPU 21 determines that there is no e-mail message to be read (S202: NO), control proceeds to S212.

In S212, the CPU 21 pauses for a predetermined period (e.g., a period set by the user), and then control returns to S201.

When the CPU 21 determines that there is an e-mail message to be read in the mail server 3 (S202: YES), the CPU 21 controls the MFP 2 to retrieve one e-mail message which has not yet been read from the e-mail storage 34a of the HDD 34 of the mail server 3 in S203. At this stage, a copy of the e-mail message which has been retrieved is remained in the mail server 3. It should be noted that, in S203, the MFP 2 retrieves all the e-mail messages directed to the common e-mail address.

In S204, the CPU 21 determines whether the retrieved e-mail message has an attached file. When the e-mail message has the attached file (S204: YES), control proceeds to S205. When it is determined that there is no attached file (S204: NO), control proceeds to S206. It should be noted that the determination in S204 is made based on whether the e-mail message includes the character string 113 ("Content-Type: multipart/mixed"). That is, when the e-mail message includes the character string 113, the CPU 21 determines that a file is attached to the e-mail message, while when the character string 113 is not included in the e-mail message, the CPU 21 determines that no file is attached to the e-mail message.

When the CPU 21 determines that a file is attached to the e-mail message (S204: YES), the CPU 21 extracts a character string 119 indicative of a data type from the attached file section 112, and determines, based on the extracted character string 114, whether the attached file is a Tiff file (i.e., whether the data type is TIFF-F) in S205. When the extracted character string is "Content-Type: image/tiff", the CPU 21 determines that the attached file is the Tiff file.

When the CPU 21 determines that the attached file is the Tiff file (S205: YES), control proceeds to S213. Since the MFP 2 has a function of printing out Tiff files (i.e., since the MFP 2 has an Internet facsimile function), the CPU 21 determines that the e-mail message retrieved in S203 is directed to the MFP 2 currently executing the procedure of FIG. 6. In S213, the CPU 21 prints out the Tiff file attached to the e-mail message retrieved in S203 (i.e., an I-FAX printing procedure) using the printer unit 27. Then, control proceeds to S211.

When the CPU 21 determines that the attached file is not the Tiff file (S205: NO), control proceeds to S206.

In S206, the CPU 21 scans the body of the e-mail message retrieved in S203 for the character string 104a ("REQUEST DEVICE").

When the body of the e-mail message includes the character string 104a ("REQUEST DEVICE") (S207: YES), control proceeds to S208. When the character string 104a is not included in the e-mail message (S207: NO), control returns to S202.

When the character string 104a is included in the body of the e-mail message (S207: YES), the CPU 21 determines whether the character string 104b which follows the character string 104a coincides with the device name that is stored in the device name storing area 24a of the EEPROM 24. When the CPU 21 determines that the character string 104b coincides with the device name (S208: YES), control proceeds to S209. When the character string 104b is different from the device name stored in the device name storing area 24a (S208: NO), control returns to S202.

When it is determined that the character string 104b coincides with the device name (S208: YES), that is, when the e-mail message is directed to the MFP 2 executing the procedure, the CPU 21 detects key words (e.g., the character string 105 in FIG. 3A) in the body of the e-mail message, and collects the information of the MFP 2 corresponding to the key words as detected (e.g., the remaining toner amount and the consumed recording sheets in FIG. 3A). Then, the CPU 21 creates an e-mail message for reply as shown in FIG. 3B based on the contents of the e-mail message retrieved in S203 and the collected information in S209, and control proceeds to S210.

In S210, the CPU 21 controls the MFP 2 to transmits the e-mail message created in S209 to the e-mail address that is indicated in the character string 101 of the e-mail message retrieved in S203. Then, control proceeds to S211.

In S211, the CPU 21 controls the MFP 2 to delete the copy of the e-mail message retrieved in S203 from the mail server 3. Then, control proceeds to S102.

According to the communication system 1 employing the e-mail message obtaining procedure according to the second embodiment, each of the MFPs 2a-2d determines that an e-mail message is directed thereto when the e-mail address of the e-mail message is the common e-mail message, and a file attached to the e-mail message can be processed thereby. Further, each of the MFPs 2a-2d determines that an e-mail message is directed thereto when the e-mail address of the e-mail message is the common e-mail message, and the character string 104b following the character string 104a ("REQUEST DEVICE:") represents the device name thereof. Therefore, it is not necessary to assign different e-mail addresses to the plurality of MFPs, and each e-mail message is received only by the destination device.

Further, according to the above procedure, each of the MFPs 2a-2d delete the e-mail message directed thereto after the e-mail message is received. Therefore, the e-mail messages which have already been read are not remained in the mail server 3, which reduces the load to the mail server 3.

According to the MFPs 2a-2d of the second embodiment, a procedure compatible to the Internet facsimile can be performed. Further, by sending an e-mail message to each MFP 2, the status (e.g., the remaining toner amount and the consumed amount of the recording sheets) can be obtained remotely.

Third Embodiment

Hereinafter, the communication system according to the third embodiment will be described. The third embodiment has the same hardware configuration as the first or second embodiment. Accordingly, the configuration of the communication system 1 according to the third embodiment is similar to that in FIG. 1, and the MFP 2 and the mail server 3 according to the second embodiment are similar to those shown in FIGS. 2A and 2B.

Figure 8:
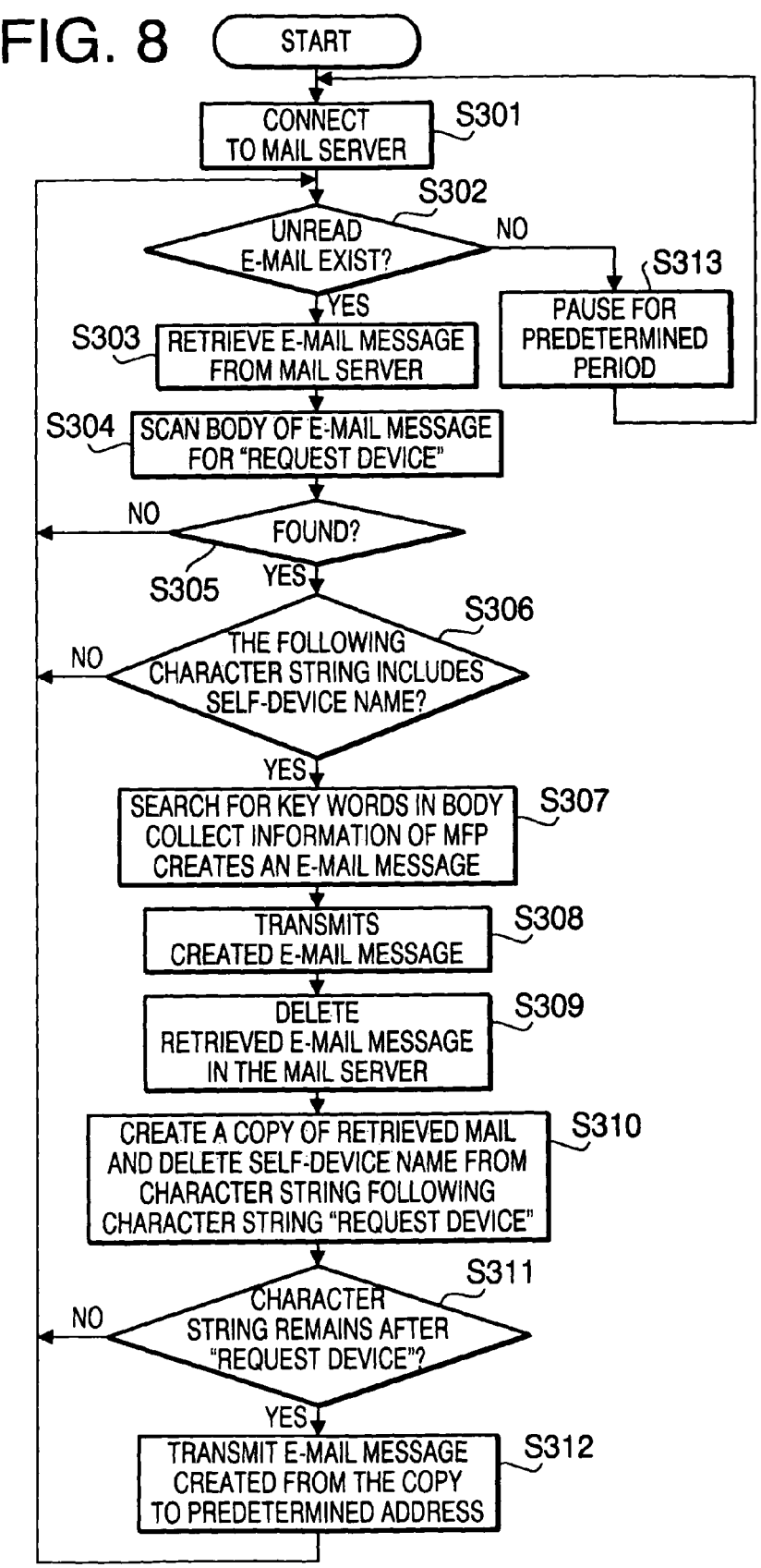
FIG. 8 is a flowchart illustrating an e-mail message obtaining procedure according to a third embodiment.

According to the third embodiment, the CPU 21 reads out an e-mail obtaining program from the ROM 22 when the MFP 2 is powered ON, for example, and executes an e-mail obtaining procedure shown in FIG. 8. It should be noted that the ROM 22 stores various programs including the e-mail obtaining program mentioned above to be executed by the CPU 21.

FIG. 7 shows an example of an e-mail message transmitted from the personal computer 8 to the MFPs 2a, 2b and 2c according to the third embodiment. The e-mail message transmitted, for example, by MFP 2b in response to the e-mail message shown in FIG. 7 may be similar to that shown in FIG. 3B.

When an e-mail message is transmitted to a plurality of devices having the common e-mail address, the device names of the plurality of devices (MFPs) are indicated in the character string 104b as shown in FIG. 7.

For example, when an e-mail message is transmitted to the MFPs 2a, 2b and 2c, the device names thereof (i.e., BRN_001, BRX_001, BRN_002) are included in the character string 104b as shown in FIG. 7.

Next, an e-mail obtaining procedure according to the third embodiment will be described with reference to FIG. 8.

FIG. 8 is a flowchart illustrating the e-mail obtaining procedure performed by the MFP 2 according to the third embodiment. The procedure is initiated when, for example, the MFP 2 is powered ON, and the CPU 21 of the MFP 2 retrieves an e-mail obtaining program from the ROM 22 and executes the same. It should be noted that the MFPs 22a-22d execute the e-mail obtaining procedure shown in FIG. 8 individually.

In S301, the CPU 21 connects the MFP 2 with the mail server 3. Next, the CPU 21 inquires the mail server 3 whether there are e-mail messages addressed to the common e-mail address and have not yet been read in the e-mail message storage 34a of the HDD 34 of the mail server 3. It should be noted that the common e-mail address is stored in the common e-mail address storing area 24b of the EEPROM 24. Then, based on the result of the inquiry, the CPU 21 determines whether there is an e-mail message to be read in S302. When the CPU 21 determines that the is an e-mail message to be read (S302: YES), control proceeds to S303. When the CPU 21 determines that there is no e-mail message to be read (S302: NO), control proceeds to S313.

In S313, the CPU 21 pauses for a predetermined period (e.g., a period set by the user), and then control returns to S301.

When the CPU 21 determines that there is an e-mail message to be read in the mail server 3 (S302: YES), the CPU 21 controls the MFP 2 to retrieve one e-mail message which has not yet been read from the e-mail storage 34a of the HDD 34 of the mail server 3 in S303. At this stage, a copy of the e-mail message which has been retrieved is remained in the mail server 3.

In S304, the CPU 21 scans the body of the e-mail message retrieved in S303 for the character string 104a ("REQUEST DEVICE").

When the body of the e-mail message includes the character string 104a ("REQUEST DEVICE") (S305: YES), control proceeds to S306. When the character string 104a is not included in the e-mail message (S305: NO), control returns to S302.

When the character string 104a is included in the body of the e-mail message (S305: YES), the CPU 21 determines whether the character string 104b which follows the character string 104a coincides with the device name that is stored in the device name storing area 24a of the EEPROM 24. When the CPU 21 determines that the character string 104b includes the device name (S306: YES), control proceeds to S307. When the character string 104b does not include the device name stored in the device name storing area 24a (S306: NO), control returns to S302.

For example, when the e-mail message retrieved in S303 has the contents shown in FIG. 7, the CPU 21 of the each of MFPs 2a, 2b and 2c determines that the character string 104b includes its device name in S306 of the procedure executed in each MFPs 2a, 2b and 2c, while the CPU 21 of the MFP 2d determines that the character string 104b does not include its device name.

When it is determined that the character string 104b includes the device name (S306: YES), the CPU 21 detects key words (e.g., the character string 105 in FIG. 3A) in the body of the e-mail message, and collects the information of the MFP 2 corresponding to the key words as detected (e.g., the remaining toner amount and the consumed recording sheets in FIG. 3A). Then, the CPU 21 creates an e-mail message for reply as shown in FIG. 3B based on the contents of the e-mail message retrieved in S303 and the collected information in S307, and control proceeds to S308.

In S308, the CPU 21 controls the MFP 2 to transmits the e-mail message created in S307 to the e-mail address that is indicated in the character string 101 of the e-mail message retrieved in S303. Then, control proceeds to S309.

In S309, the CPU 21 controls the MFP 2 to delete the copy of the e-mail message retrieved in S303 from the mail server 3. Then, control proceeds to S310.

In S310, the CPU 21 creates a copy of the e-mail message retrieved in S303 (alternatively, reads out the e-mail message which was retrieved in S303 and is stored in the RAM 23), and deletes the device name of the MFP 2 from the character string 104b in the e-mail message.

For example, when the MFP 2b retrieves the e-mail message shown in FIG. 7 in S303, the character string 104b in the e-mail message created in S310 is "BRN_001, BRN_002". If the MFP 2b retrieves the e-mail message shown in FIG. 3A in S303, the character string 104b of the e-mail message created in S310 has no characters (i.e., the e-mail message does not have the character string 104b).

In S311, the CPU 21 determines whether the character string 104b exists in the e-mail message created in S310. When the CPU 21 determines that there is the character string 104b (S311: YES), control proceeds to S312. When the CPU 21 determines that the character string 104b does not exist in the e-mail message created in S310 (S311: NO), control returns to S302.

For example, when the MFP 2b retrieves the e-mail message shown in FIG. 7 in S303, there exits the character string 104b even after the device name of the MFP 2b (i.e., "BRX_001") is deleted (S311: YES). In this case, control proceeds to S312. If the MFP 2b retrieves the e-mail message shown in FIG. 3A in S303, the character string 104b is deleted in the e-mail message created in S310 (S311: NO). In this case, control returns to S302.

When the CPU 21 determines that there exist the character string 104b, which follows the character string 104a (i.e., "REQUEST DEVICE") (S311: YES), the CPU 21 transmits the e-mail message created in S310 to the common e-mail address. It should be noted that the e-mail message transmitted in S312 is similar to the e-mail message retrieved in S303 except that the character string 104b has been modified. Then, control returns to S302. It should be noted that the e-mail message transmitted in S312 is stored in the mail storage 34a of the HDD 34 of the mail server 3.

Thus, when the character string 104b of the e-mail message retrieved in S303 includes another MFP's device name, the copy of the e-mail message retrieved in S303 is deleted from the mail server 3 (S309), a new e-mail message similar to the e-mail message retrieved in S303 except that the device name of the MFP 2 executing the procedure of FIG. 8 is deleted from the character string 104b is created in S310, and the thus created e-mail message is transmitted to the common e-mail address (S312). As a result, the e-mail message retrieved in S303 is updated (i.e., only the character string 104b is modified).

When the character string 104b of the e-mail message retrieved in S303 includes only the device name of the MFP 2 executing the procedure shown in FIG. 8, the copy of the e-mail message is deleted from the mail server 3 (S309), and control returns to S302 without executing steps S310-S312.

According to the communication system 1 employing the e-mail message obtaining procedure according to the third embodiment, each of the MFPs 2a-2d determines that an e-mail message is directed thereto when the e-mail address of the e-mail message is the common e-mail message, and the character string 104b following the character string 104a ("REQUEST DEVICE:") includes the device name thereof. Therefore, it is not necessary to assign different e-mail addresses to the plurality of MFPs, and each e-mail message is received only by the destination device.

When the character string 104b includes a plurality of device names, the e-mail message stored in the mail storage 34a of the HDD 34 of the mail server 3 is updated by removing the device name of the MFP 2 that reads the e-mail message. Therefore, although only one e-mail message is transmitted to the mail server, it is received by the plurality of MFPs as desired.

Further, when the character string 104b includes only the device name of the MFP 2 that reads the e-mail message, the e-mail message is removed from the mail server after a procedure corresponding to the e-mail message has been performed. Therefore, the e-mail messages which have already been read are not remained in the mail server 3, which reduces the load to the mail server 3.

Furthermore, by sending an e-mail message to the MFP 2, the status (e.g., the remaining toner amount and the consumed amount of the recording sheet) can be obtained remotely.

Fourth Embodiment

Hereinafter, the communication system according to the fourth embodiment will be described. The fourth embodiment has the same hardware configuration as the first, second or third embodiment. Accordingly, the configuration of the communication system 1 according to the fourth embodiment is similar to that in FIG. 1, and the MFP 2 and the mail server 3 according to the second embodiment are similar to those shown in FIGS. 2A and 2B.

Figure 9:
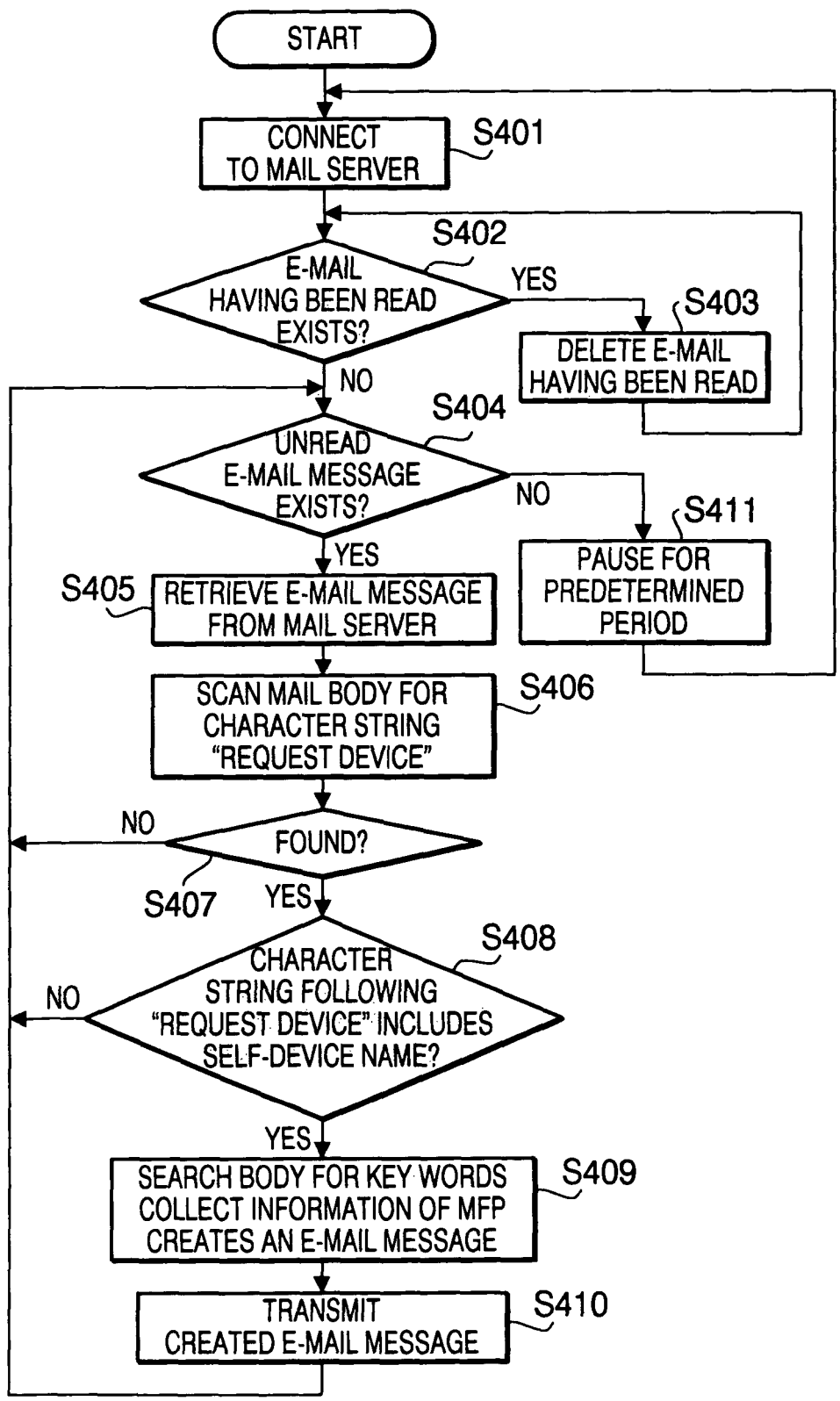
FIG. 9 is a flowchart illustrating an e-mail message obtaining procedure according to a fourth embodiment.

According to the fourth embodiment, the CPU 21 reads out an e-mail obtaining program from the ROM 22 when the MFP 2 is powered ON, for example, and executes an e-mail obtaining procedure shown in FIG. 9. It should be noted that the ROM 22 stores various programs including the e-mail obtaining program mentioned above to be executed by the CPU 21.

Next, the e-mail obtaining procedure performed in the communication system 1 according to the fourth embodiment will be described with reference to FIG. 9. FIG. 9 is a flowchart illustrating the e-mail message obtaining procedure, executed by the CPU 21, according to the fourth embodiment. As described above, the procedure shown in FIG. 9 is started when, for example, the MFP 2 is powered ON, as the CPU 21 retrieves the e-mail obtaining program from the ROM 22 and executes the same. Similarly to the first, second or third embodiment, the MFPs 2a-2d execute the e-mail obtaining procedure shown in FIG. 9, respectively.

In S401, the CPU 21 connects the MFP 2 with the mail server 3. Next, the CPU 21 inquires the mail server 3 whether there is an e-mail messages, which is addressed to the common e-mail address and has been read, in the e-mail message storage 34a of the HDD 34 of the mail server 3. It should be noted that the common e-mail address is stored in the common e-mail address storing area 24b of the EEPROM 24. Then, based on the result of the inquiry, the CPU 21 determines whether there is an e-mail message having been read in S402. When the CPU 21 determines that there is an e-mail message having been read (S402: YES), control proceeds to S403. In S403, the CPU 21 controls the MFP 2 to delete the e-mail message which has been read from the mail storage 34a of the HDD 34 of the mail server 3, and control returns to S402. By repeating steps S402 and S403, all the e-mail messages addressed to the common e-mail address and having been read are deleted from the mail storage 34a of the HDD 34 of the mail server 3. When the CPU 21 determines that there is no e-mail message having been read (S402: NO), control proceeds to S404.

In S404, the CPU 21 inquires the mail server 3 whether there are e-mail messages, which are addressed to the common e-mail address and have not yet been read, in the e-mail message storage 34a of the HDD 34 of the mail server 3. Then, based on the result of the inquiry, the CPU 21 determines whether there is an e-mail message to be read in S404. When the CPU 21 determines that the is an e-mail message to be read (S404: YES), control proceeds to S405. When the CPU 21 determines that there is no e-mail message to be read (S404: NO), control proceeds to S411.

In S411, the CPU 21 pauses for a predetermined period, and then control returns to S401. It is preferable that the predetermined period for which the CPU 21 pauses in S411 is set to a period within which each of other MFPs 2 having the same e-mail address (i.e., the common e-mail address) accesses the mail server at least once.

When the CPU 21 determines that there is an e-mail message to be read in the mail server 3 (S404: YES), the CPU 21 controls the MFP 2 to retrieve one e-mail message which has not yet been read from the e-mail storage 34a of the HDD 34 of the mail server 3 in S405. At this stage, a copy of the e-mail message which has been retrieved is remained in the mail server 3.

It should be noted that, in S405, the MFP 2 retrieves all the e-mail messages directed to the common e-mail address.

In S406, the CPU 21 scans the body of the e-mail message retrieved in S405 for the character string 104a ("REQUEST DEVICE").

When the body of the e-mail message includes the character string 104a ("REQUEST DEVICE") (S407: YES), control proceeds to S408. When the character string 104a is not included in the e-mail message (S407: NO), control returns to S404.

When the character string 104a is included in the body of the e-mail message (S408: YES), the CPU 21 determines whether the character string 104b which follows the character string 104a includes the device name that is stored in the device name storing area 24a of the EEPROM 24. When the CPU 21 determines that the character string 104b includes the device name (S408: YES), control proceeds to S409. When the character string 104b does not include the device name stored in the device name storing area 29a (S408: NO), control returns to S404.

When it is determined that the character string 104b includes the device name (S408: YES), the CPU 21 detects key words (e.g., the character string 105 in FIG. 3A or FIG. 7) in the body of the e-mail message, and collects the information of the MFP 2 corresponding to the key words as detected (e.g., the remaining toner amount and the consumed recording sheets in FIG. 3A or FIG. 7). Then, the CPU 21 creates an e-mail message for reply as shown in FIG. 3B based on the contents of the e-mail message retrieved in S405 and the collected information in S409, and control proceeds to S410.

In S410, the CPU 21 controls the MFP 2 to transmits the e-mail message created in S409 to the e-mail address that is indicated in the character string 101 of the e-mail message retrieved in S405. Then, control proceeds to S404.

By executing steps S404 through 5410, all the e-mail messages which have not been read are processed. Thereafter, it is determined that there is no e-mail message to be read (S404: NO), and after the pause for the predetermined period of time (S411), control returns to S401. Then, the MFP 2 is connected to the mail server 3 and, in S402, the e-mail messages processed in S404-S410 are deleted from the mail server 3 (S402: YES; S403).

According to the communication system 1 employing the e-mail message obtaining procedure according to the fourth embodiment, each of the MFPs 2a-2d determines that an e-mail message is directed thereto when the e-mail address of the e-mail message is the common e-mail message, and the character string 104b following the character string 104a ("REQUEST DEVICE:") represents the device name thereof. Therefore, it is not necessary to assign different e-mail addresses to the plurality of MFPs, and each e-mail message is received only by the destination device.

Further, according to the above procedure, the MFP 2 deletes the e-mail message directed thereto predetermined period after the procedure corresponding to the received e-mail message is performed. Therefore, the e-mail message directed to a plurality of MFPs can be received by respective MFPs, and further the e-mail message having been read is not remained in the mail server 3 unnecessarily, which reduces the load to the mail server 3.

Of course, similarly to the other embodiments, the status of the MFPs 2 can be obtained at a remote place only by transmitting an e-mail message.

Fifth Embodiment

Next, a communication system according to the fifth embodiment will be described.

Figure 10:
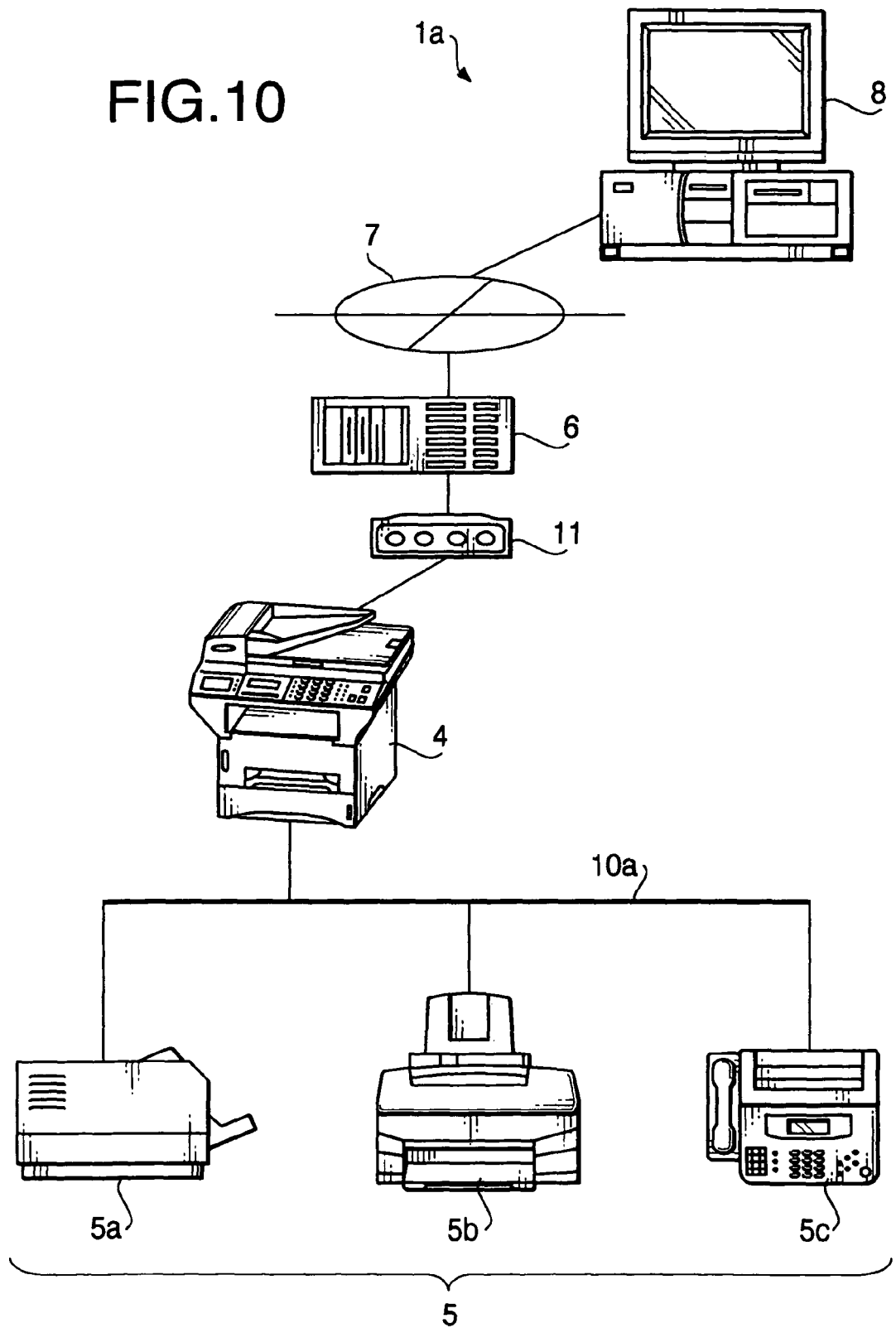
FIG. 10 shows a configuration of a communication system to which a fifth embodiment of the invention can be applied.
Figure 11C:
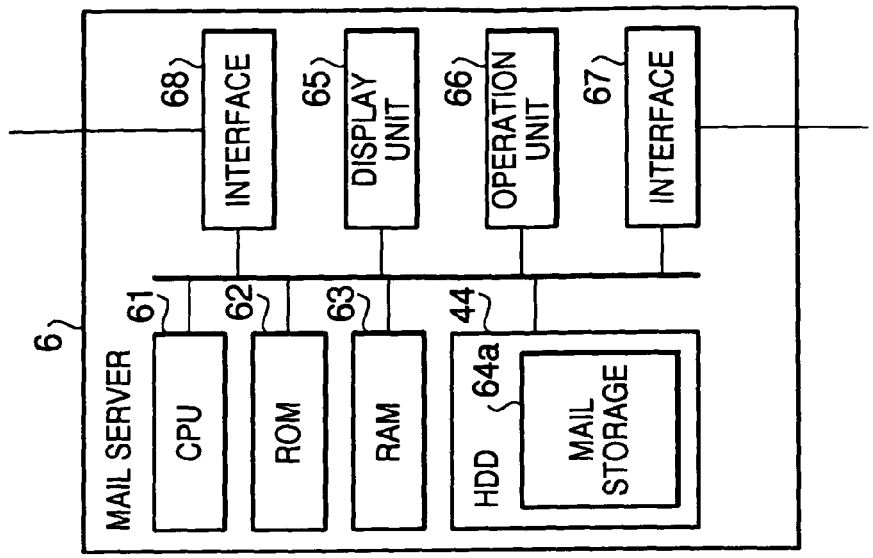
FIGS. 11A through 11C show block diagrams of MFPs and a mail server included in the communication system shown in FIG. 10.
Figure 11B:
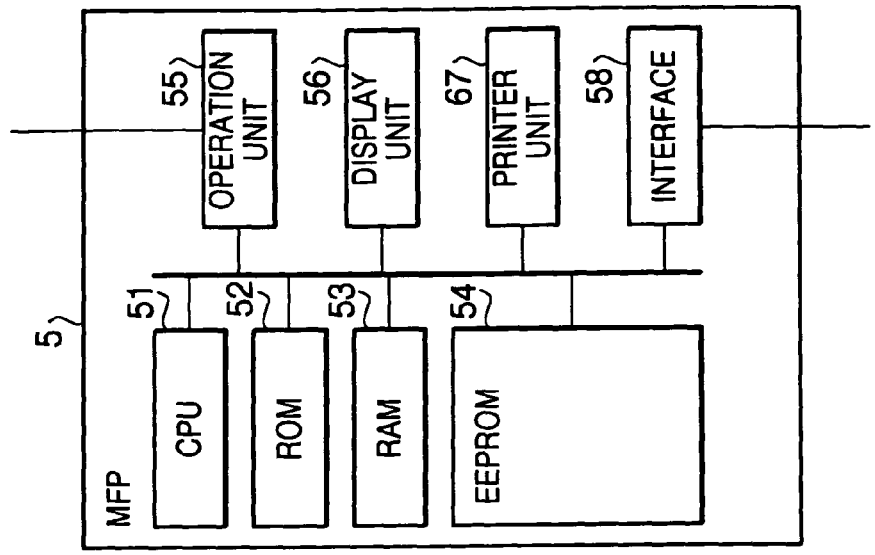
Figure 11A:
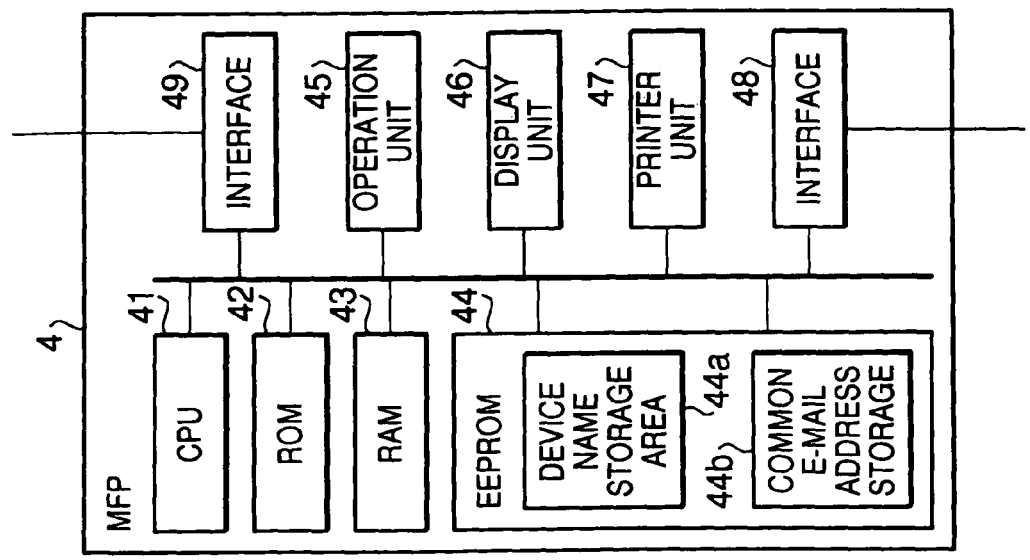

FIG. 10 shows an exemplary configuration of a communication system 1a to which the fifth embodiment of the invention can be applied. FIGS. 11A through 11C show block diagrams of an MFP 4, an MFP 5 and a mail server 6 included in the communication system 1a shown in FIG. 10.

The communication system 1a is configured such that, as shown in FIG. 10, a personal computer 8 and the mail server 6 are connected through the Internet 7. Further, the mail server 6 and the MFP 4 are connected through a MODEM 11, and the MFP 4 and MFPs 5 (i.e., the MFPs 5a, 5b and 5c) are connected through the LAN 10a so as to be communicable with each other. For simplifying the description, each of the MFPs 5a-5c is occasionally referred to as the MFP 5. Each of the MFP 4 and the MFPs 5 has a function of obtaining an e-mail message addressed to a predetermined e-mail address, and is capable of printing TIFF-F format data. It should be noted that, according to the fifth embodiment, the same e-mail address (e.g., "main@sample.com") is assigned to all of the MFPs 4 and 5 (5a-5c), while different device names are assigned thereto. Specifically, the device names "BRN_001", "BRX_001", "BRN_002" and "BRX_002" are assigned to the MFPs 4, 5a, 5b and 5c, respectively. In this embodiment, the MFPs 5a-5c are under control of the MFP 4.

The MFPs 4 and 5 are operable in accordance with an SNMP (Simple Network Management Protocol). The SNMP is a management protocol under an IP (Internet Protocol) network environment which is standardized with IETF (Internet Engineering Task Protocol). In accordance with the SNMP, electronic devices are managed as management information called MIB (Management Information Base) between an SNMP manager at a managing side and an SNMP agent at a managed side.

FIGS. 11A, 11B and 11C show block diagrams of the MFPs 4 and 5, and the mail server 6 included in the communication system 1a.

The MFP 4 has, as shown in FIG. 11A, a CPU (central processing unit) 41, a ROM 42, a RAM 43, an EEPROM 44, an operation unit 45, a display unit 46, a printer unit 47 and interfaces 48 and 49.

The CPU 41 executes various operations and procedures. According to the fifth embodiment, the CPU 41 reads out an electronic mail obtaining program from the ROM 42 when, for example, the MFP 4 is powered ON, and executes the e-mail obtaining procedure shown in FIG. 12, which will be described later.

The ROM 42 is a read only memory, and functions as a part of a main memory of the MFP 4. The ROM 42 stores various programs such as a system program and an e-mail message obtaining program to be executed by the CPU 41. The RAM 43 is a readable/writable volatile memory. The RAM 43 also functions as a part of the main memory of the MFP 4, and has a work area storing intermediate results of data processing executed by the CPU 41.

The EEPROM 44 is a readable/writable non-volatile memory, which retains data stored therein even when it is powered OFF. The EEPROM 44 has a device name storing area 44a storing a device name intrinsic to the MFP 4 and MFPs 5a-5c managed by the MFP 4 (i.e., BRN_001 for MFP 4, BRX_002 for MFP 5a, BRN_002 for MFP 5b and BRX_002 for MFP 5c), and a common e-mail address storage 44b storing the common e-mail address (i.e., "main@sample.com"). The device name storing area 49a includes a self-name storing area which stores the device name of the MFP 4 and a managed device name storing area which stores the device names of the managed MFPs 5a-5c. Since the device names are store as described above, it becomes possible to determine whether the device name included in an e-mail message (i.e., the character string 104b) is the device name of the MFP 9 or the managed MFPs 5.

The operation unit 45 is used for inputting data and/or command in the MFP 4. Typically, the operation unit 45 is provided with a keyboard having a predetermined number of keys, and a touch panel provided on a screen of the display unit 46. The display unit 46 displays various information on the screen. Typically, the display unit 46 includes an LCD or plasma display. The LCD may be a simple matrix type such as an STN type of a DSTN type, or an active matrix type such as a TFT type. The printer unit 47 provides a monochromatic or color printer function. The interface 48 connects the MFP 4 to the MODEM 11 so that the MFP 4 is communicable with devices connected to the MODEM 11. The interface 49 connects the MFP 4 to the LAN 10a so that the MFP 4 can communicate with devices connected to the LAN 10a.

The MFP 5 (5a, 5b and 5c) includes, as shown in FIG. 11B, a CPU 51, a ROM 52, a RAM 53, an EEPROM 54, an operation unit 55, a display unit 56, a printer unit 57 and an interface 58.

The CPU 51 executes various operations and procedures. According to the fifth embodiment, the CPU 51 returns the remaining amount of toner and the consumed amount of the recording sheet to the MFP 4 in response to the request by the MFP 4. The ROM 52 is a read only memory, and functions as a part of a main memory of the MFP 5. The ROM 52 stores various programs such as a system program 5 to be executed by the CPU 51. The RAM 53 is a readable/writable volatile memory. The RAM 53 also functions as a part of the main memory of the MFP 5, and has a work area storing intermediate results of data processing executed by the CPU 51.

The EEPROM 54 is a readable/writable non-volatile memory, which retains data stored therein even when it is powered OFF.

The operation unit 55 is used for inputting data and/or command in the MFP 5. Typically, the operation unit 55 is provided with a keyboard having a predetermined number of keys, and a touch panel provided on a screen of the display unit 56. The display unit 56 displays various information on the screen. The printer unit 57 provides a monochromatic or color printer function. The interface 58 connects the MFP 5 to the LAN 10*a* so that the MFP 5 can communicate with devices connected to the LAN 10*a*.

The mail server 6 includes, as shown in FIG. 11C, a CPU 61, a ROM 62, a RAM 63, an HDD 64, a display unit 65, an operation unit 66, and interfaces 67 and 68.

The CPU 61 executed various operations. For example, the CPU 61 stores the email messages transmitted from the personal computer 8 and/or the MFP 4 in a mail storage 64*a* of the HDD 64, and provides the same upon requests from the MFP 4. The CPU 61 can erase the e-mail messages stored in the mail storage 64*a* upon request by the MFP 4.

The ROM 62 is a read-only memory, which functions as a part of the main memory of the mail server 6. The ROM 62 stores various programs including a system program to be executed by the CPU 61. The RAM 63 is a readable/writable volatile memory, which also functions as a part of the main memory of the mail server 6. The RAM 63 has a work area for storing intermediate result of data processing. The HDD 64 is a readable/writable data storage (i.e. a hard disk) and a reading/writing device thereof. The HDD 64 includes the mail storage 64*a* for storing the e-mail messages transmitted to the mail server 6.

The display unit 65 is a device for displaying various information on the display. The display unit 65 typically includes an LCD or plasma display. The operation unit 66 is used for inputting data/command in the mail server 6. The operation unit 66 typically includes a keyboard having a plurality of keys and a pointing device such as a mouse. The interface 67 connects the mail server 6 to the Internet 7 so as to enable the communication with the devices connected to the Internet 7. The interface 68 connects the mail server 6 to the MODEM 11 so as to enable the communication with devices connected to the MODEM 11.

Hereinafter, an e-mail obtaining procedure performed in the communication system 1*a* will be described with reference to FIG. 12.

FIG. 12 is a flowchart illustrating the e-mail obtaining procedure performed by the MFP 4 according to a fifth embodiment. The procedure is initiated when, for example, the MFP 4 is powered ON, and the CPU 41 of the MFP 4 retrieves an e-mail obtaining program from the ROM 42 and executes the same.

In S501, the CPU 41 connects the MFP 4 with the mail server 6. Next, the CPU 41 inquires the mail server 6 whether there are e-mail messages addressed to the common e-mail address and have not yet been read in the e-mail message storage 64*a* of the HDD 64 of the mail server 6. It should be noted that the common e-mail address is stored in a common e-mail address storing area 44*b* of the EEPROM 44. Then, based on the result of the inquiry, the CPU 41 determines whether there is an e-mail message to be read in S502. When the CPU 41 determines that the is an e-mail message to be read (S502: YES), control proceeds to S503. When the CPU 41 determines that there is no e-mail message to be read (S502: NO), control proceeds to S512.

In S512, the CPU 41 pauses for a predetermined period, and then control returns to S501.

When the CPU 41 determines that there is an e-mail message to be read in the mail server 6 (S502: YES), the CPU 41 controls the MFP 4 to retrieve one e-mail message which has not yet been read from the e-mail storage 64*a* of the HDD 64 of the mail server 6 in S503. At this stage, a copy of the e-mail message which has been retrieved is remained in the mail server 6.

It should be noted that, in S503, the MFP 4 also retrieves the e-mail messages directed to the MFPs 5*a*-5*c* which are managed by the MFP 4.

In S504, the CPU 21 scans the body of the e-mail message retrieved in S503 for the character string 104*a* ("REQUEST DEVICE").

When the body of the e-mail message includes the character string 104*a* ("REQUEST DEVICE") (S505: YES), control proceeds to S506. When the character string 104*a* is not included in the e-mail message (S505: NO), control returns to S502.

When the character string 104*a* is included in the body of the e-mail message ($505: YES), the CPU 41 determines whether the character string 104*b*, which follows the character string 104*a*, includes at least one of the device names stored in the device name storing area 44*a* of the EEPROM 44 (i.e., the device name of the MFP 4 or the device names of the MFPs 5*a*-5*c*). When the CPU 41 determines that the character string 104*b* includes the device name stored in the device name storing area 44*a* (S506: YES), control proceeds to S507. When the character string 104*b* does not include the device name(s) stored in the device name storing area 44*a* (S506: NO), control returns to S502.

That is, during the steps S504-S506, if the address of an e-mail message in the mail server 6 is the common e-mail address, a device name is obtained from the body (i.e., the character string 104*b*) of the e-mail message directed to the common e-mail address. Then, based on whether the device name is of the MFP 4 or MFP 5 (5*a*, 5*b* or 5*c*), the CPU 41 determines whether the e-mail message is addressed to the MFP 4 or the MFP 5 (5*a*, 5*b* or 5*c*).

When it is determined that the character string 104*b* coincides with the device name stored in the device name storing area 94*a* (S506: YES), the CPU 41 determines, in S507, whether the device name (i.e., the character string 104*b*) is of the MFP 4 or the MFP 5 (5*a*, 5*b* or 5*c*).

When the CPU 41 determines that the character string 104*b* coincides with the device name of itself (i.e., MFP 4), control proceeds to S508. In S508, the CPU 41 detects key words (e.g., the character string 105 in FIG. 3A) in the body of the e-mail message, and collects the information of the MFP 4 corresponding to the key words as detected (e.g., the remaining toner amount and the consumed recording sheets in FIG. 3A). Then, the CPU 41 creates an e-mail message for reply as shown in FIG. 3B based on the contents of the e-mail message retrieved in S503 and the collected information in S508, and control proceeds to S510.

When the character string 104*b* is not the device name of the MFP 4 (S507: NO), it coincides with one of the managed MFPs 5*a*-5*c*. In this case, in S509, the CPU 41 searches for key words (e.g., the character string 105) in the body of the e-mail message. Then, the CPU 91 controls the MFP 4 to request for information corresponding to the searched key words (e.g., the remaining amount of the toner, the consumed amount of the recording sheet, etc.) to the MFP 5 (5*a*, 5*b* or 5*c*) having the device name designated by the character string 104*b* using a GET command of the SNMP. Then, the MFP 4 receives a reply to the request which is transmitted from the MFP 5 (5*a*, 5*b* or 5*c*) using a REPLY command of the SNMP. The CPU 41 creates an e-mail message for replying to the e-mail message retrieved in S503 in accordance with the contents of the e-mail message and the information collected as above, and control proceeds to S510.

In S510, the CPU 41 controls the MFP 4 to transmits the e-mail message created in S508 or S509 to the e-mail address that is indicated in the character string 101 of the e-mail message retrieved in S503. Then, control proceeds to S511.

In S511, the CPU 41 controls the MFP 4 to delete the copy of the e-mail message retrieved in S503 from the mail server 6. Then, control proceeds to S502.

According to the communication system 1*a* employing the e-mail message obtaining procedure according to the fifth embodiment, the MFP 4 determines the destination of the e-mail address referring to the character string 104*b* followings the character string 104*a* (i.e., "REQUEST DEVICE"). Therefore, it is not necessary to assign different e-mail addresses to the MFPs 4, 5*a*, 5*b* and 5*c*.

Further, according to the above procedure, the MFP 4 deletes the e-mail message directed thereto or to the MFP 5 (5*a*, 5*b* or 5*c*) managed by the MFP 4 after the e-mail message is received and the procedure corresponding to the e-mail message is executed. Therefore, the e-mail messages which have already been read are not remained in the mail server 6, which reduces the load to the mail server 6.

As described above, by transmitting the e-mail messages to the MFP 4 and 5 (5*a*, 5*b* and 5*c*), the status such as the remaining amount of the toner and the consumed amount of the recording sheets can be obtained in a remote device.

It should be noted that the present invention need not be limited to the above-described exemplary embodiments, and various modification can be considered by a person skilled in the art without departing from the scope of the invention. For example, in the above embodiments, a procedure which corresponds to the received e-mail message creates a replying e-mail message, and transmits the same. However, the invention need not be limited to such a configuration, and the body of the replying e-mail message may be printed and/or an attached file (e.g., the TIFF-F format data file) may be printed, optionally or alternatively.

The fourth embodiment may be modified such that, steps similar to S204, S205 and S213 of the second embodiment may be inserted between S405 and S406.

In the above-described embodiments, as the e-mail address of the replying e-mail message, the e-mail address indicated by the character string 101 of the e-mail message retrieved from the mail server is used. The invention need not be limited to such a configuration and can be modified as follows. That is, the personal computer transmits an e-mail having the replaying e-mail address information (e.g., "REPLY TO: main@smaple.com"). Then, the MFP which received the e-mail message from the personal computer scans for the character string "REPLY TO:" and the e-mail address following the character string, and transmits the replying e-mail message to the thus obtained e-mail address.

In the above-described second embodiment, the TIFF-F type data is indicated as an example of the data which can be processed in the MFP 2. The invention need not be limited to such a configuration, and various type of data such as the "PS", "PDF", "TEXT", "Gif", and "DOC" data may be processed.

In the above-described embodiments, the MFP is described as an example. However, the invention is not limited to the configuration of the embodiments and any other electronic devices such as printers can be configured in a similar manner.

In the fifth embodiment, the MFP 5 is configured to be able to receive an e-mail message. However, the invention need not be limited to such a configuration. The MFP 5 may be configured not to receive the e-mail message. In such case, the system may be configured such that the personal computer 8 exchanges e-mail messages with the MEP 4, which manages the MFPs 5, and obtains the status of the MFPs 5 via the MFP 4.

In the above-described embodiments, one e-mail message is retrieved from the mail server at a time. This may be modified such that a plurality of or all of e-mail messages may be retrieved from the mail server. Alternatively, only necessary portions of e-mail messages may be retrieved from the mail server.

The e-mail message obtaining program described in each of the embodiments may be stored in a computer accessible recording medium such as a CD-ROM.

The present disclosure relates to the subject matter contained in Japanese Patent Application No. 2002-333868, filed on Nov. 18, 2002, which is expressly incorporated herein by reference in its entirety.

What is claimed is:

1. An electronic device comprising:
   a first determination system that, upon receiving an e-mail message that
   includes e-mail addresses and contents other than the e-mail addresses, determines whether an e-mail address of the e-mail message transmitted to a mail server coincides with a predetermined common e-mail address, the predetermined common e-mail address being commonly assigned to and shared by a plurality of the electronic devices;
   a second determination system that determines whether the e-mail message addressed to the predetermined common e-mail address is directed to the electronic device to which said second determination system belongs in accordance with the contents of the e-mail message addressed to the predetermined common e-mail address; and
   a processing system that executes a procedure corresponding to the e-mail message when said second determination system determines that the e-mail message is directed to the electronic device to which said second determination system belongs,
   wherein the plurality of electronic devices are part of a communication system having the mail server and the plurality of electronic devices connected with a network,
   wherein the e-mail message has attached data to be processed, and [wherein processing of the attached data including printing of the attached data,
   wherein each of said plurality of electronic devices has a data type obtaining system that obtains a data type of the attached data from the contents of the e-mail message, and wherein said second determination system determines whether the e-mail message is directed to the electronic device to which said second determination system belongs based on whether the attached data can be processed by said electronic device.

2. The electronic device according to claim 1, wherein the attached data is TIFF-F format data.

3. The electronic device according to claim 1, further comprising an e-mail deleting system that deletes the e-mail message corresponding to the procedure executed by the processing system from the mail server.

4. The electronic device according to claim 1, further comprising an e-mail deleting system that deletes the e-mail message corresponding to the procedure executed by the processing system from the mail server predetermine period after the procedure has been executed.

5. An electronic device comprising:
a first determination system that, upon receiving an e-mail message that includes e-mail addresses and contents other than the e-mail addresses, determines whether an e-mail address of the e-mail message transmitted to a mail server coincides with a predetermined common e-mail address, the predetermined common e-mail address being commonly assigned to and shared by a plurality of the electronic devices;
a second determination system that determines whether the e-mail message addressed to the predetermined common e-mail address is directed to the electronic device to which said second determination system belongs in accordance with the contents of the e-mail message addressed to the predetermined common e-mail address; and
a processing system that executes a procedure corresponding to the e-mail message when said second determination system determines that the e-mail message is directed to the electronic device to which said second determination system belongs,
wherein the plurality of electronic devices are part of a communication system having the mail server and the plurality of electronic devices connected with a network,
wherein the procedure executed by said processing system includes creation and transmission of a replying e-mail message replying to the e-mail message,
wherein the e-mail message contains a request for a status of the electronic device, and
wherein the replying e-mail message contains a status of the electronic device to which the processing system belongs,
wherein the e-mail message has attached data to be processed, wherein each of said plurality of electronic devices has a data type obtaining system that obtains a data type of the attached data from the contents of the e-mail message; and
wherein said second determination system determines whether the e-mail message is directed to the electronic device to which said second determination system belongs based on whether the attached data can be processed by said electronic device.

6. An electronic device comprising:
a first determination system that, upon receiving an e-mail message that includes e-mail addresses and contents other than the e-mail addresses, determines whether an e-mail address of the e-mail message transmitted to a mail server coincides with a predetermined common e-mail address, the predetermined common e-mail address being commonly assigned to and shared by the electronic device and at least one terminal device;
a second determination system that determines whether the e-mail message addressed to the predetermined common e-mail address is directed to one of the electronic device and said at least one terminal device in accordance with the contents of the e-mail message addressed to the predetermined common e-mail address; and
a processing system that executes a procedure corresponding to the e-mail message when said second determination system determines that the e-mail message is directed to one of said electronic device and said at least one terminal device,
wherein the electronic device is part of a communication system having the mail server, the electronic device and the at least one terminal device, and the at least one terminal device is managed by said electronic device,
wherein the procedure executed by said processing system includes creation and transmission of a replying e-mail message replying to the e-mail message, wherein the e-mail message contains a request for the status of a designated device, and wherein a replying e-mail message contains the status of the designated device,
wherein the e-mail message has attached data to be processed, wherein each of said electronic device and said at least one terminal device has a data type obtaining system that obtains a data type of the attached data from the contents of the e-mail message, and
wherein said second determination system determines whether the e-mail message is directed to the electronic device or said at least one terminal device based on whether the attached data can be processed by said electronic device or the at least one terminal device.

7. The communication system according to claim 6, further comprising an e-mail deleting system that deletes the e-mail message corresponding to the procedure executed by the processing system from said mail server.

8. The communication system according to claim 6, further comprising an e-mail deleting system that deletes the e-mail message corresponding to the procedure executed by the processing system from said mail server predetermine period after the procedure has been executed.

9. The communication system according to claim 6, wherein said electronic device obtains status information of said at least one
terminal device in accordance with a predetermined communication protocol when the request is for the status of said at least one terminal device; and
wherein the replying e-mail message contains a status of one of the electronic device and said at least one terminal device.

10. The communication system according to claim 9, wherein the status includes at least one of a remaining amount of toner and a remaining amount of sheet.

11. An electronic device comprising:
a first determination system that, upon receiving an e-mail message that
includes e-mail addresses and contents other than the e-mail addresses, determines whether an e-mail address of the e-mail message transmitted to a mail server coincides with a predetermined common e-mail address, the predetermined common e-mail address being commonly assigned to and shared by a plurality of electronic devices;
a second determination system that determines whether the e-mail message addressed to the predetermined common e-mail address is directed to said electronic device in accordance with the contents of the e-mail message addressed to the predetermined common e-mail address; and
a processing system that executes a procedure corresponding to the e-mail message when said second determination system determines that the e-mail message is directed to said electronic device,
wherein the electronic device is part of a communication system having a mail server and a plurality of electronic devices that are connected with a network, and the electronic device is one of the plurality of electronic devices,
wherein the e-mail message has attached data to be processed, and wherein processing of the attached data including printing of the attached data, wherein each of said plurality of electronic devices has a data type obtaining system that obtains a data type of the attached data from the contents of the e-mail message, and wherein said second determination system determines whether the e-mail message is directed to the electronic device based on whether the attached data can be processed by said electronic device.

12. A computer for a communication system, said computer comprising:

an e-mail creating system that creates an e-mail message that includes e-mail addresses and contents other than the e-mail addresses, the e-mail message being addressed to a common e-mail addressed which is commonly used by a plurality of electronic devices, the predetermined common e-mail address being commonly assigned to and shared by the plurality of electronic devices;

an electronic device selecting system that enables an operator of said computer to select at least one of said plurality of electronic devices, information indicative of the selected one of said plurality of electronic devices being inserted in the e-mail message; and an information designating system that enables the operator to designate information to be obtained from the selected at least one of the plurality of electronic devices, information indicative of the designated information being inserted in the e-mail message, the communication system being configured such that only the designated at least one of the plurality of electronic device processes the contents of the e-mail message, the e-mail message being transmitted to a mail server, wherein the mail server and the plurality of electronic devices are connected with a network and said computer is connected with the mail server, wherein the e-mail message has attached data to be processed, wherein each of said plurality of electronic devices has a data type obtaining system that obtains a data type of the attached data from the contents of the e-mail message, and wherein the e-mail message is determined to be directed to the one of the plurality of electronic devices based on whether the attached data can be processed by the one of the plurality of electronic devices.

13. The computer according to claim 12, wherein the communication system is configured such that, when the mail server receives the e-mail message including the information indicative of the designating at least one of the plurality of electronic devices and information indicative of the designated information, a replying e-mail message containing a status in terms of the designated information of the designated at least one of the plurality of electronic devices being transmitted to said computer.

14. The computer according to claim 13, further comprising a display, a visual interface being provided so as to display a window on said display, the window allowing the operator to select at least one of the plurality of electronic devices sharing the common e-mail address, the visual interface inserting information indicative of the selected at least one of the plurality of electronic devices in the e-mail message.

15. The computer according to claim 14, where the window displayed on said display allows the operator to select one or more pieces of information to be obtained from the designated one of the plurality of electronic devices, the visual interface inserting information indicative of the one or more pieces of information to be obtained from the designated at least one of the plurality of electronic devices in the e-mail message.

16. A computer readable non-transitory storage medium having embedded thereon a computer program product, the computer program product comprising the instructions of:

determining, upon receiving an e-mail message that includes e-mail addresses and contents other than the e-mail addresses, whether an e-mail address of the e-mail message transmitted to a mail server coincides with a predetermined common e-mail address, the predetermined common e-mail address being commonly assigned to and shared by a plurality of electronic devices;

determining whether the e-mail message addressed to the predetermined common e-mail address is directed to the electronic device of the plurality of electronic devices in accordance with the contents of the e-mail message addressed to the predetermined common e-mail address; and executing a procedure corresponding to the e-mail message when it is determined that the e-mail message is directed to the electronic device, wherein the computer program product controls a computer to function as the electronic device which is part of a communication system having a mail server and the plurality of electronic devices which are connected with a network, and the electronic device is one of the plurality of electronic devices, wherein the e-mail message has attached data to be processed, wherein each of said plurality of electronic devices has a data type obtaining system that obtains a data type of the attached data from the contents of the e-mail message, and wherein the e-mail message is determined to be directed to the electronic device based on whether the attached data can be processed by said electronic device.

17. A computer readable non-transitory storage medium having embedded thereon a computer program product, the computer program product comprising the instructions of:

determining, upon receiving an e-mail message that includes e-mail addresses and contents other than the e-mail addresses, whether an e-mail address of the e-mail message transmitted to a mail server coincides with a predetermined common e-mail address, the predetermined common e-mail address being commonly assigned to and shared by an electronic device and at least one terminal device;

determining whether the e-mail message addressed to the predetermined common e-mail address is directed to one of the electronic device and the at least one terminal device in accordance with the contents of the e-mail message addressed to the predetermined common e-mail address; and executing a procedure corresponding to the e-mail message when it is determined that the e-mail message is directed to one of the electronic device and the at least one terminal device, wherein the computer program controls a computer to function as the electronic device for a communication system having the mail server, the electronic device and the at least one terminal device, and the at least one terminal device is managed by the electronic device, wherein the e-mail message has attached data to be processed, and [wherein processing of the attached data including printing of the attached data, wherein each of said electronic device and said at least one terminal device has a data type obtaining system that obtains a data type of the attached data from the contents of the e-mail message, and wherein the e-mail message is determined to be directed to the electronic device or said at least one terminal device based on whether the attached data can be processed by said electronic device or the at least one terminal device.

18. The electronic device according to claim 1, wherein the second determination system determines whether or not the e-mail message should be directed only to the device and not to any other devices.

19. The electronic device according to claim 1, wherein, when said second determination system determines that the e-mail message is directed to the electronic device to which said second determination system belongs, the processing system directs the e-mail message only to the device, and not to any other devices.

20. The electronic device according to claim 1, wherein, when the second determination system determines that the e-mail message is not directed to the electronic device, the processing system will not forward the e-mail message to the electronic device.

* * * * *